US011969968B2

(12) United States Patent
Otsuka et al.

(10) Patent No.: US 11,969,968 B2
(45) Date of Patent: Apr. 30, 2024

(54) METHOD FOR MANUFACTURING SHEET MATERIAL CONTAINER

(71) Applicant: KAO CORPORATION, Tokyo (JP)

(72) Inventors: Takahiro Otsuka, Sumida-ku (JP); Tsubasa Oyama, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 33 days.

(21) Appl. No.: 17/997,854

(22) PCT Filed: May 8, 2020

(86) PCT No.: PCT/JP2020/018701
§ 371 (c)(1),
(2) Date: Nov. 3, 2022

(87) PCT Pub. No.: WO2021/224995
PCT Pub. Date: Nov. 11, 2021

(65) Prior Publication Data

US 2023/0158768 A1 May 25, 2023

(51) Int. Cl.
*B31B 70/00* (2017.01)
*B31B 70/26* (2017.01)
(Continued)

(52) U.S. Cl.
CPC .......... *B31B 70/002* (2017.08); *B31B 70/004* (2017.08); *B31B 70/006* (2017.08);
(Continued)

(58) Field of Classification Search
CPC ..... B31B 70/002; B31B 70/26; B31B 70/006; B31B 70/004; B31B 2170/20; B31B 2160/20; B31B 70/14
(Continued)

(56) References Cited

U.S. PATENT DOCUMENTS

2007/0089377 A1 4/2007 Yasuhira
2015/0033671 A1* 2/2015 Stanley .................. B65B 3/045
53/410

FOREIGN PATENT DOCUMENTS

JP 2006-27697 A 2/2006
JP 2007-118961 A 5/2007
(Continued)

OTHER PUBLICATIONS

International Search Report dated Jul. 21, 2020 in PCT/JP2020/018701 filed on May 8, 2020 (11 pages).

*Primary Examiner* — Jacob A Smith
(74) *Attorney, Agent, or Firm* — Oblon, McClelland, Maier & Neustadt, L.L.P.

(57) ABSTRACT

A method for manufacturing a sheet material container where the sheet material container includes one or a plurality of sheet members including a main-body forming sheet member that has an outer film layer and an inner film layer which are mutually stacked, a containing region that accommodates contents, and a container body that is configured from the main-body forming sheet member and that surrounds the containing region, and the main-body forming sheet member having a main-body sealing portion, which is an attached region between the outer film layer and the inner film layer, and a non-attached region where the outer film layer and the inner film layer are partially not attached, and further having a filling portion where a filler is enclosed between the layers of the outer film layer and the inner film layer in the non-attached region.

16 Claims, 15 Drawing Sheets

(51) Int. Cl.
*B31B 70/14* (2017.01)
*B31B 160/20* (2017.01)
*B31B 170/20* (2017.01)

(52) U.S. Cl.
CPC .............. *B31B 70/26* (2017.08); *B31B 70/14* (2017.08); *B31B 2160/20* (2017.08); *B31B 2170/20* (2017.08)

(58) Field of Classification Search
USPC .......................................................... 493/186
See application file for complete search history.

(56) References Cited

FOREIGN PATENT DOCUMENTS

| | | | | | |
|---|---|---|---|---|---|
| JP | 2016-525050 | A | | 8/2016 | |
| JP | 2018-144363 | A | | 9/2018 | |
| JP | 2019-172347 | A | | 10/2019 | |
| JP | 2019172347 | A | * | 10/2019 | .............. B65F 77/04 |

* cited by examiner

METHOD FOR MANUFACTURING SHEET MATERIAL CONTAINER

CROSS REFERENCE TO RELATED APPLICATIONS

This application is a National Stage entry under 35 U.S.C. § 371 of PCT/JP2020/018701, filed on May 8, 2020, and is incorporated herein by reference.

TECHNICAL FIELD

The present invention relates to a method for manufacturing a sheet material container.

BACKGROUND ART

Patent Document 1, for example, discloses a method for manufacturing a sheet material container with a structure in which a filling portion is formed that has a plurality of film layers stacked and that has a filler such as air enclosed between the layers.

CITATION LIST

Patent Document 1: Japanese Patent Publication No. 2016-525050.

SUMMARY OF THE INVENTION

The present invention relates to a method for manufacturing a sheet material container that is configured including: one or a plurality of sheet members including a main-body forming sheet member that has an outer film layer and an inner film layer which are mutually stacked, the sheet material container being provided with: a containing region that accommodates contents, and a container body that is configured from the main-body forming sheet member and that surrounds the containing region, and the main-body forming sheet member having a main-body sealing portion, which is an attached region between the outer film layer and the inner film layer, and a non-attached region where the outer film layer and the inner film layer are partially not attached, and further having a filling portion where a filler is enclosed between the layers of the outer film layer and the inner film layer in the non-attached region, the method including: introducing gas into the containing region so as to expand the container body; and injecting the filler between the layers of the outer film layer and the inner film layer in the non-attached region in a state where the container body has been expanded.

BRIEF DESCRIPTION OF THE DRAWINGS

FIGS. 14A and 14B are diagrams to illustrate a method for manufacturing a sheet material container according to a second embodiment, of which FIG. 14A illustrates a state in which closing an external air intake hole has been performed after the expanding of the container body, and FIG. 14B illustrates a state in which injecting of filler has been performed in a state where the external air intake hole is closed.

FIGS. 15A and 15B are diagrams to illustrate a method for manufacturing a sheet material container according to a third embodiment, of which FIG. 15A illustrates a state in which vacuuming via an external air intake hole is performed after the expanding of the container body, and FIG. 15B illustrates a state in which injecting of filler has been performed.

DESCRIPTION OF EMBODIMENTS

Figure 1:
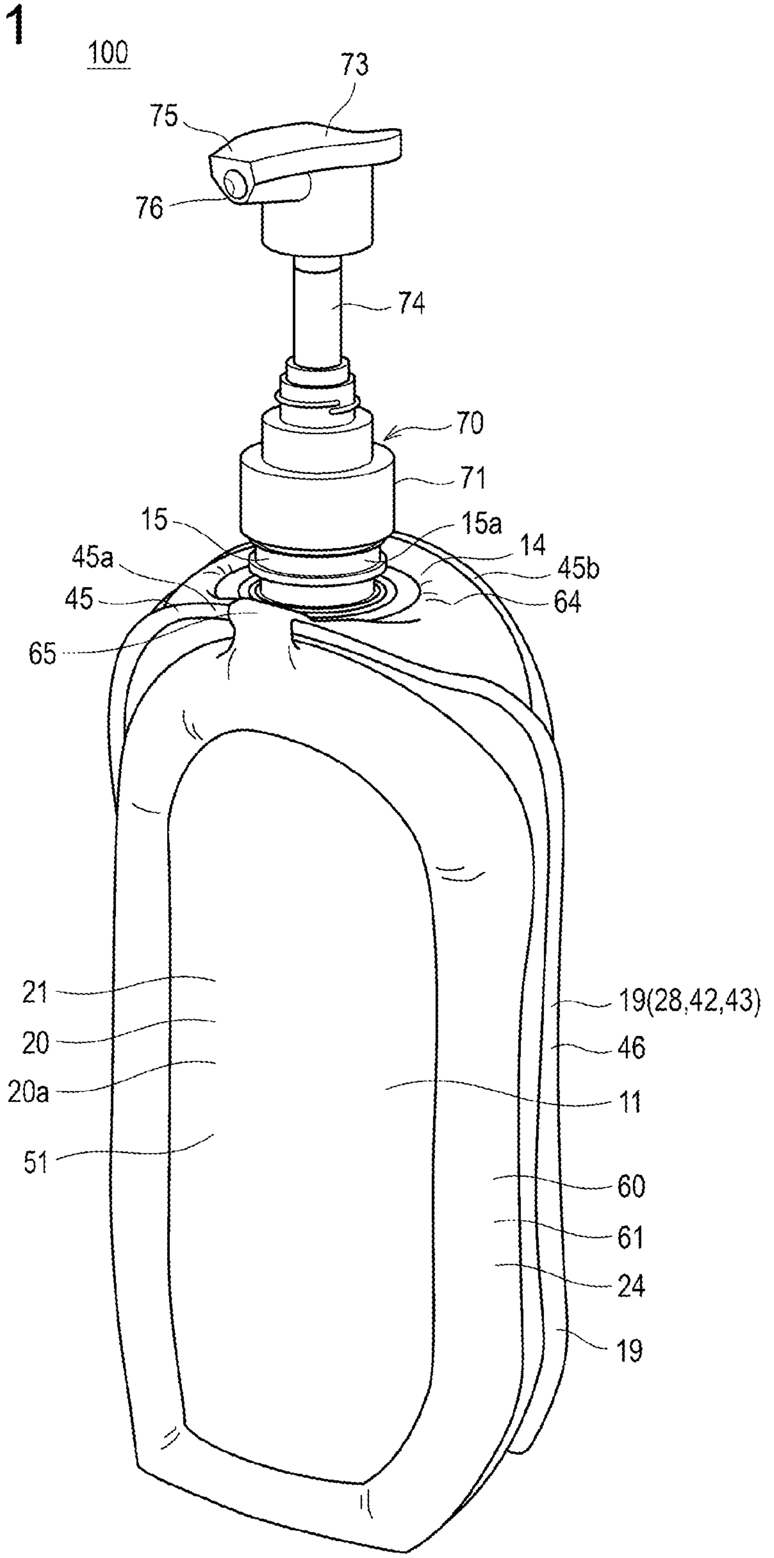
FIG. 1 is a perspective view of one preferred embodiment of a sheet material container manufactured using a method for manufacturing a sheet material container of the present invention.

According to an investigation by the present inventors, with the manufacturing method disclosed in Patent Document 1, there is room for improvement in terms of the filling properties of the filler into the filling portion.

The present invention relates to a method for manufacturing a sheet material container with which the filling properties of the filler into the filling portion are favorable.

Preferred embodiments of the present invention will be described hereinbelow using the drawings. Note that, in all the drawings, the same reference signs are assigned to similar components, and detailed descriptions thereof will not be repeated.

First Embodiment

First, a first embodiment will be described using FIGS. 1 to 13.

A method for manufacturing a sheet material container according to this embodiment is a method for manufacturing a sheet material container 100 that is configured including one or a plurality of sheet members including a main-body forming sheet member 21 that has an outer film layer 22 and an inner film layer 23 which are mutually stacked.

The sheet material container 100 is configured from a containing region 17 that accommodates contents 18 (FIG. 2) and a main-body forming sheet member 21, and includes a container body 20 that surrounds the containing region 17.

The main-body forming sheet member 21 has a main-body sealing portion 26, which is an attached region between the outer film layer 22 and the inner film layer 23, and a non-attached region 24 where the outer film layer 22 and the inner film layer 23 are partially not attached, and has a filling portion 60, where a filler is enclosed between the layers of the outer film layer 22 and the inner film layer 23 in the non-attached region 24.

The method includes introducing gas into the containing region 17 so as to expand the container body 20 (see FIG. 12), and injecting the filler between the layers of the outer film layer 22 and the inner film layer 23 in the non-attached region 24 (see FIG. 13) in a state where the container body 20 has been expanded.

According to this embodiment, the injecting of filler between the layers of the outer film layer 22 and the inner film layer 23 in the non-attached region 24 in a state where the container body 20 has been expanded is performed by causing gas to be introduced into the containing region 17 and expanding the container body 20. Accordingly, because it is possible to suppress closing of the non-attached region 24 when filling with filler, the injection of filler can be easily performed. It is also possible to fill the containing region 17 with a sufficient amount of contents 18.

In the present invention, types of contents 18 are not specifically limited. Possible contents 18 include, for example, shampoo, conditioner, body soap, detergent, bleach, softener, beverage, and food, and also include engine oil, a chemical agent, and the like.

In addition, the contents 18 may be a liquid (including a form of paste), or may be a solid (for example, in a form of particle (including a form of grain) or in a form of powder).

In the case of this embodiment, the contents 18 are, for example, a liquid.

If the contents 18 is a liquid, the viscosity of the contents 18 at 30° C. is, for example, preferably equal to or more than 1 mPa·s and equal to or less than 120,000 mPa·s (measured with a B-type viscometer; for example, measured using a Viscometer TV-10 or Viscometer TVB-10 manufactured by Toki Sangyo Co., or the like), and more preferably equal to or more than 1 mPa·s and equal to or less than 60,000 mPa·s.

The filler enclosed in the filling portion 60 may be a fluid (a gas or liquid), a solid (for example, particulate, resin pellets, or the like) or a semi-solid (for example, a foaming agent, or the like), and is preferably a gas such as air.

An example of the structure of the sheet material container 100 manufactured according to this embodiment is described hereinbelow using FIGS. 1 through 10.

In the case of this embodiment, the sheet material container 100 has a bottom gusset portion 13 (FIG. 2, FIG. 4) as the bottom part, and is capable of standing on its own in a state where the bottom gusset portion 13 is placed on a horizontal mounting surface.

Figure 2:
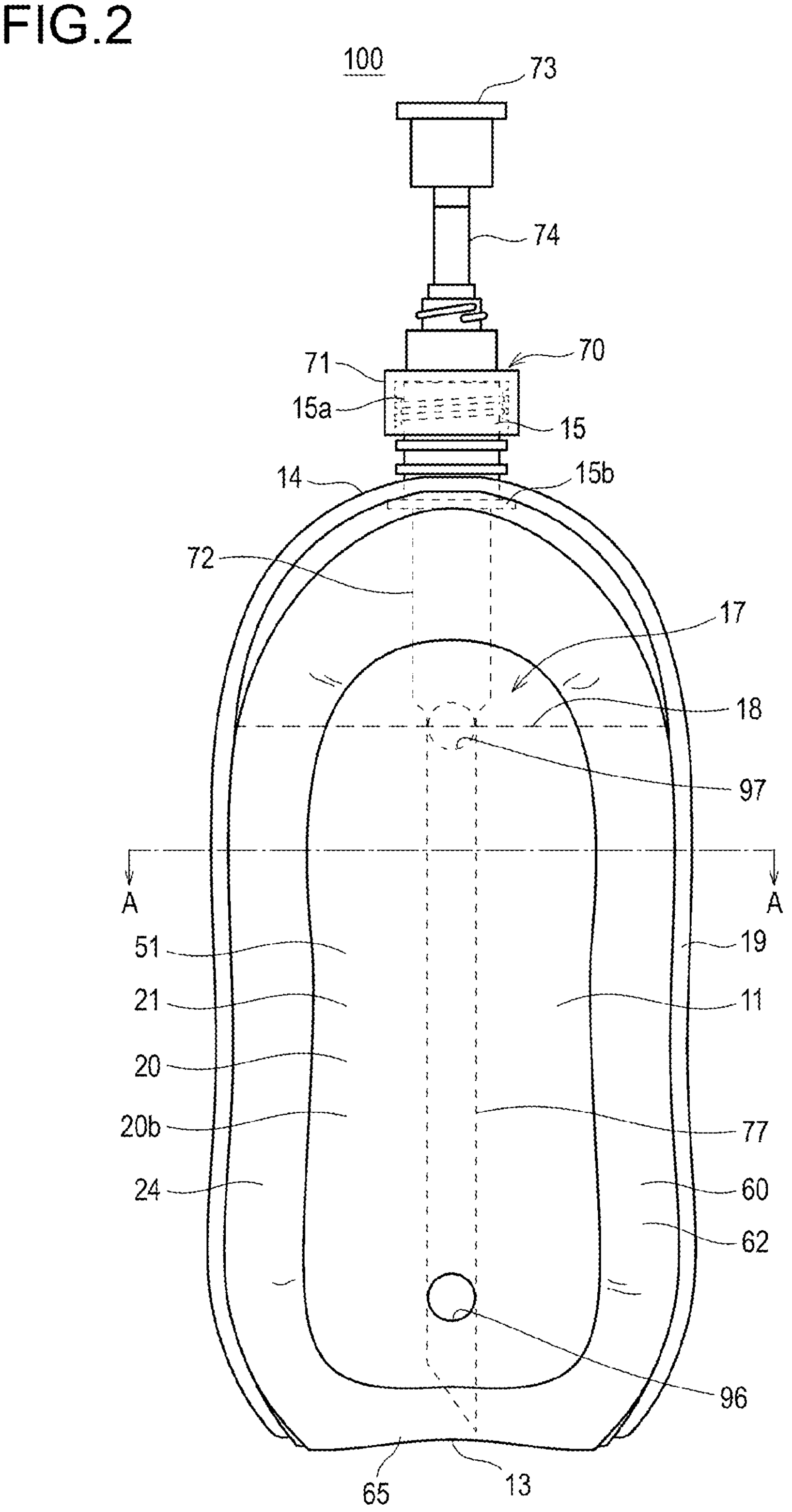
FIG. 2 is a back view of the sheet material container illustrated in FIG. 1.

In this embodiment, unless otherwise noted, the description of the positional relationship (vertical relationship, and so forth) of each component of the sheet material container 100 illustrates the positional relationship of the sheet material container 100 in a freestanding state as in FIGS. 1 and 2. However, the positional relationship in this description does not necessarily coincide with the positional relationship when the sheet material container 100 is used or manufactured.

The positional relationships of the various components of the sheet material container 100 illustrated in the respective drawings are sometimes also described.

The front surface side of the sheet material container 100 (the side away from the viewer in FIG. 2) will be referred to as the front, the back side of the sheet material container 100 (the front surface side toward the viewer in FIG. 2) will be referred to as the rear, the left side of the sheet material container 100 toward the front (the right side in FIG. 2) will be referred to as the left, and the right side of the sheet material container 100 toward the front (the left side in FIG. 2) will be referred to as the right. The left-right direction of the sheet material container 100 may also be referred to as the width direction.

In the case of this embodiment, the container body 20 is formed in the shape of a bag having a body portion 11, a top gusset portion 14 disposed on the upper side of the body portion 11, and a bottom gusset portion 13 disposed on the lower side of the body portion 11. However, the present invention is not limited to or by this example, and the container body 20 may not have the top gusset portion 14, or the same may not have the bottom gusset portion 13.

The container body 20 surrounds the containing region 17 (surrounds an inner bag 40 in the case of this embodiment). The container body 20 forms the outer shell of the sheet material container 100. In the following description, the body portion 11, top gusset portion 14, and bottom gusset portion 13 of the container body 20 may be referred to as the body portion 11, top gusset portion 14, and bottom gusset portion 13 of the sheet material container 100.

The front shape of the body portion 11 is not specifically limited, but in the case of this embodiment, for example, as illustrated in FIG. 2, has a longitudinal shape with a substantially constant width dimension, and the upper edge of the body portion 11 is formed in an upwardly convex arc.

Figure 5:
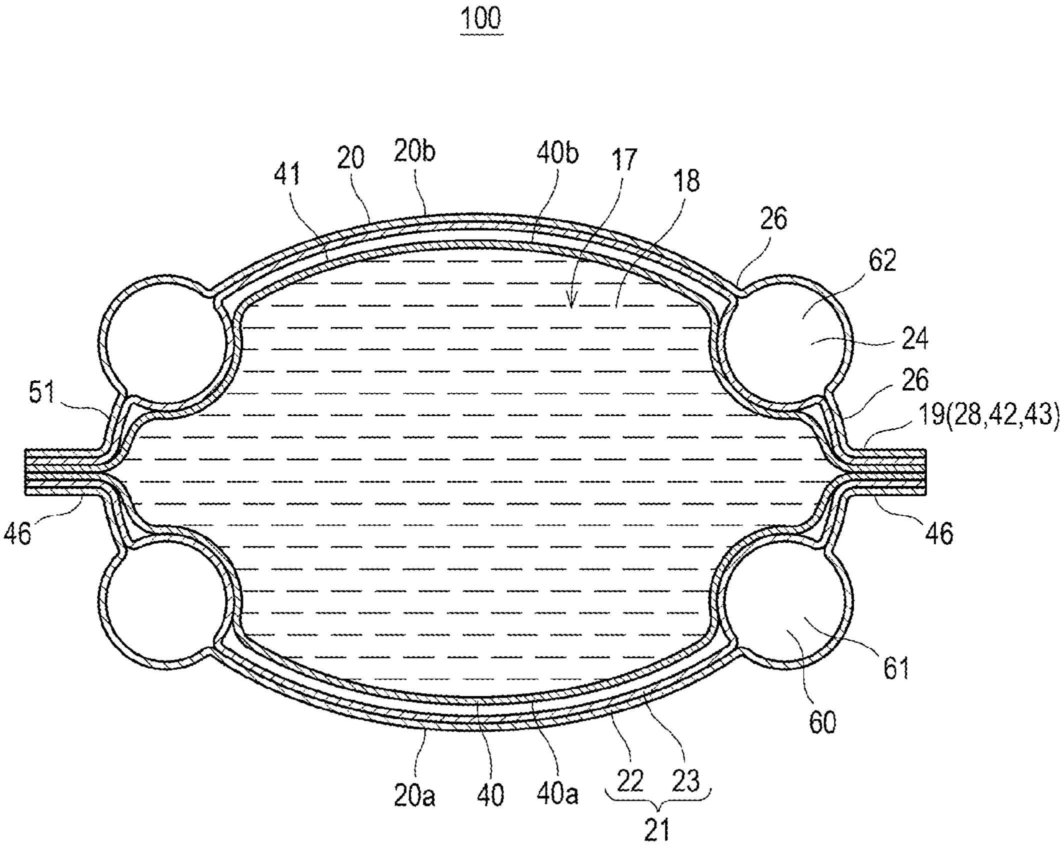
FIG. 5 is a cross-sectional view along line A-A in FIG. 2.
Figure 6:
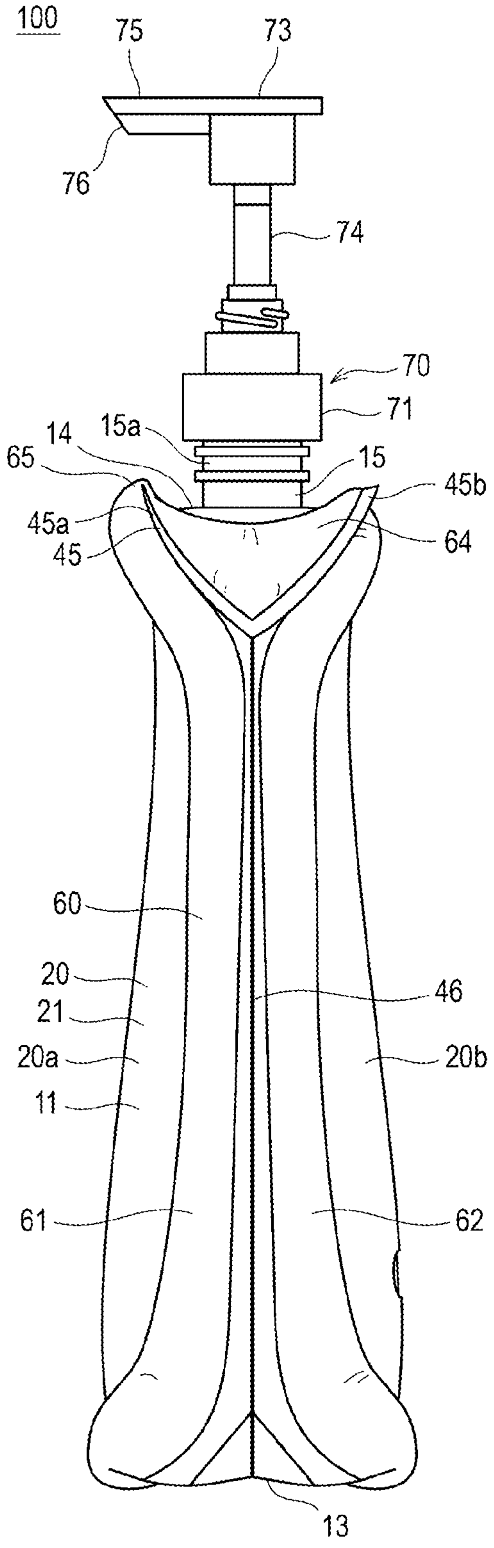
FIG. 6 is a side view of the sheet material container illustrated in FIG. 1.

As illustrated in FIG. 5, the body portion 11 has a first main surface portion 20*a* (front panel) and a second main surface portion 20*b* (rear panel) that face each other with a containing region 17 therebetween. The first main surface portion 20*a* is located on the front surface side, and the second main surface portion 20*b* is located on the back side (see also FIGS. 1 through 3).

The first main surface portion 20*a* is formed with left-right symmetry, for example, and the second main surface portion 20*b* is also formed with left-right symmetry, for example. Furthermore, the first main surface portion 20*a* and the second main surface portion 20*b* are formed with front-rear symmetry except for an interfacial connecting portion 65 (described subsequently) of the filling portion 60, for example.

The first main surface portion 20*a* bulges frontward in a convex manner, while the second main surface portion 20*b* bulges rearward in a convex manner.

The container body 20 is configured by folding the main-body forming sheet member 21 (see FIGS. 7 and 8) and mutually attaching the peripheral edge portions of the main-body forming sheet members 21 (in the case of this embodiment, through mutual attachment via the inner-bag forming sheet member 41 forming the inner bag 40).

Figure 3:
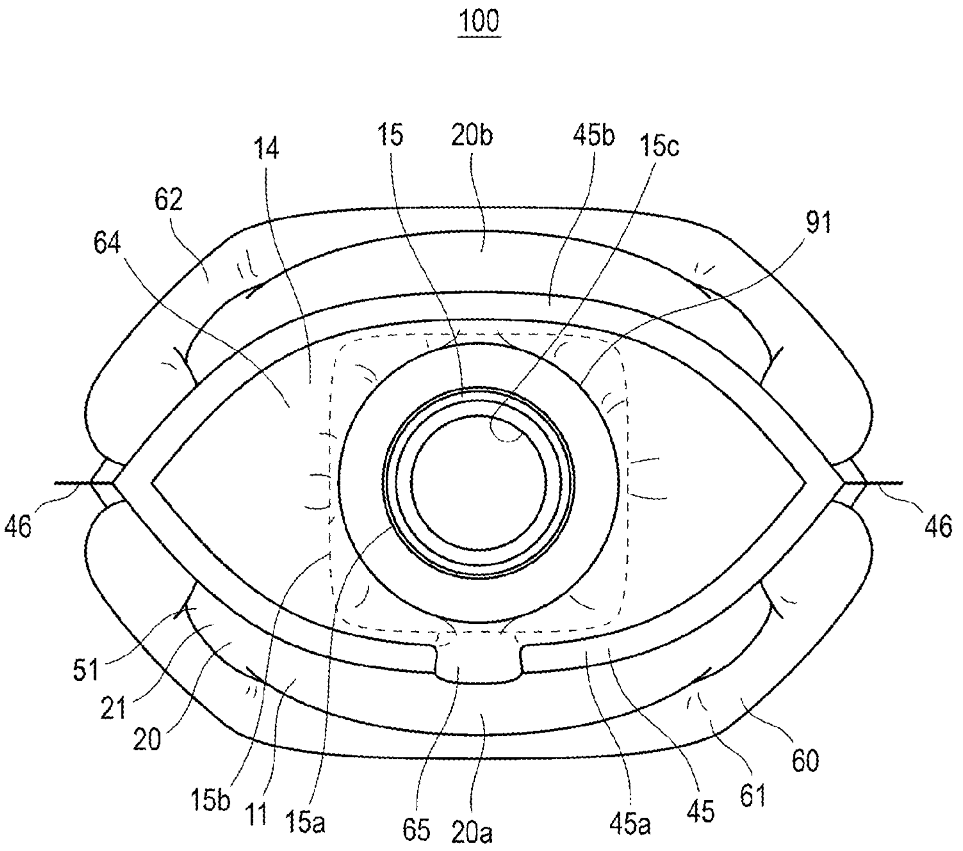
FIG. 3 is a plane view of the sheet material container illustrated in FIG. 1 and illustrating a state with a cap portion removed.
Figure 4:
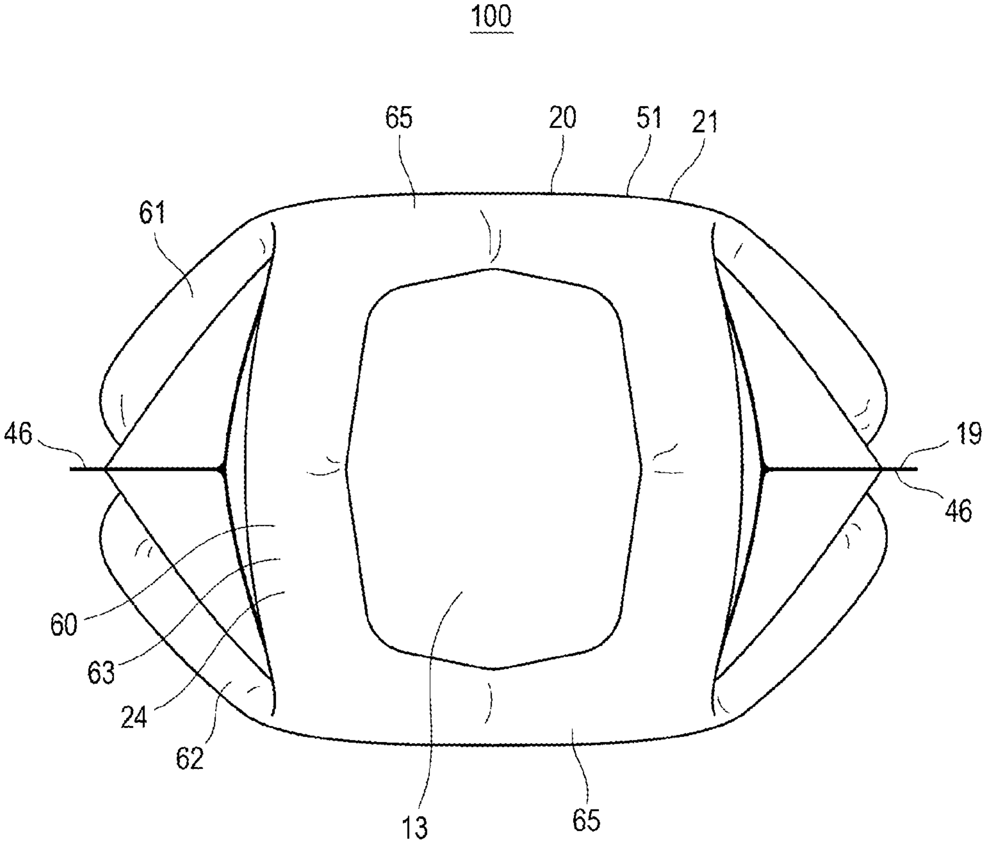
FIG. 4 is a bottom view of the sheet material container illustrated in FIG. 1.

The flat shape of the top gusset portion 14 is not specifically limited, but in the case of this embodiment, the top gusset portion 14 is formed in a shape in which the front-to-back width shrinks in moving from the center to the left in the width direction, and the front-to-back width shrinks in moving from the center to the right in the width direction, as illustrated in FIG. 3. The top gusset portion 14 is formed into a horizontal oblong shape, for example.

The container body 20 has a gusset periphery sealing strip 45 located along the periphery of the top gusset portion 14, and lateral sealing strips 46 that extend up and down along the left and right edges of the body portion 11, respectively. The gusset periphery sealing strip 45 and the lateral sealing strip 46, for example, stand toward the outside of the container body 20.

The gusset periphery sealing strip 45, for example, circumferentially surrounds the top gusset portion 14, except for the region where the interfacial connecting portion 65 (described subsequently) is present.

The gusset periphery sealing strip 45 includes a first planar portion lateral sealing strip 45*a* disposed along the boundary between the gusset (top gusset portion 14) and the first main surface portion 20*a*, and a second planar portion lateral sealing strip 45*b* disposed along the boundary between the gusset and the second main surface portion 20*b*.

Figure 8:
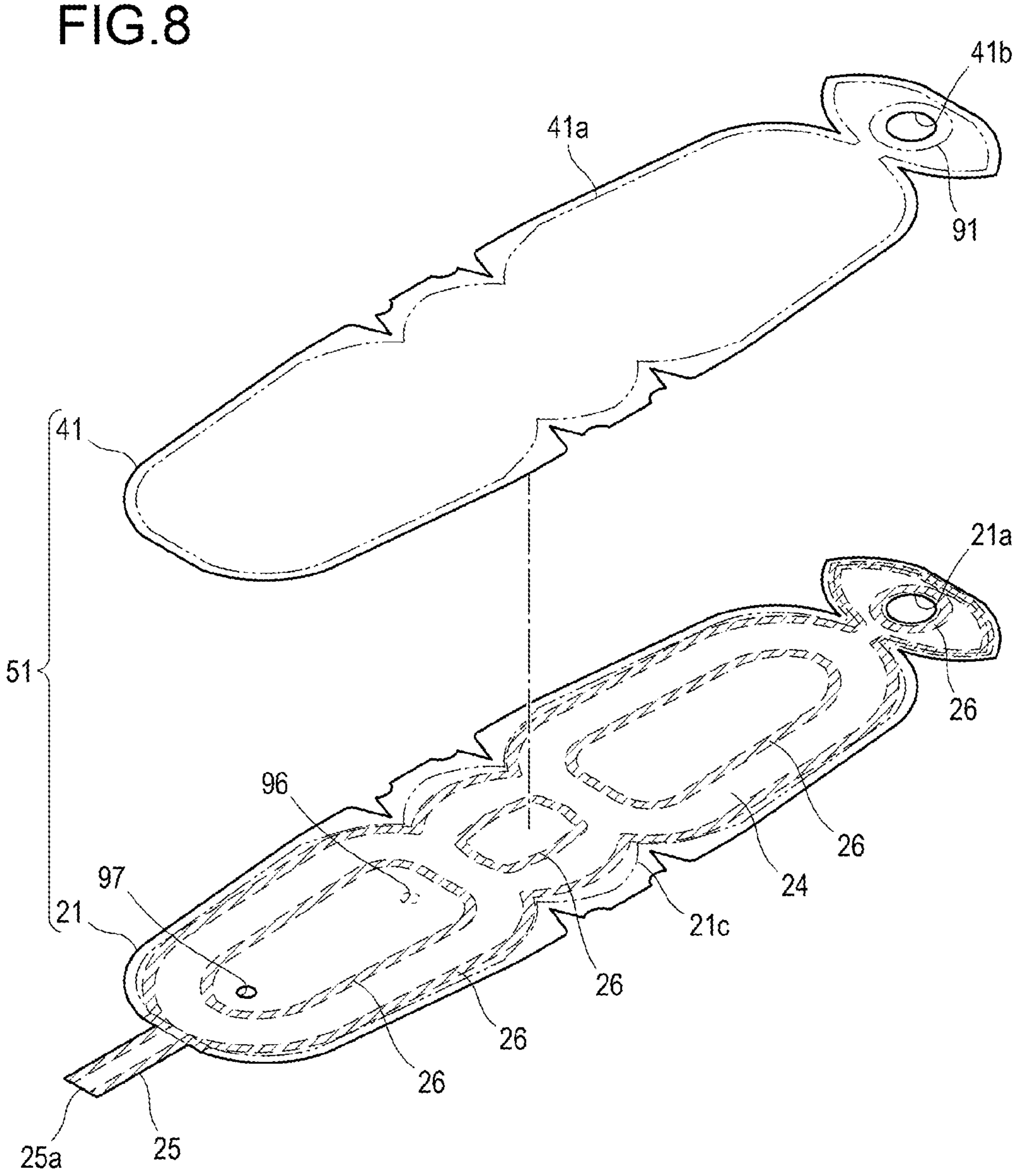
FIG. 8 is an exploded perspective view illustrating an inner-bag forming sheet member and the main-body forming sheet member.

In the case of this embodiment, the inner bag 40 is configured (see FIG. 5) by mutually attaching portions of the peripheral edge portions of the inner-bag forming sheet members 41 (see FIG. 8). In other words, the bag-shaped inner bag 40 is configured by bending the inner-bag forming sheet member 41 and mutually attaching the peripheral edge portions of the inner-bag forming sheet members 41. The inner bag 40 is covered by the container body 20. The inner bag 40 has a containing region 17 inside the inner bag 40.

Thus, the sheet material container 100 has an inner bag 40 defining the containing region 17, and the inner bag 40 is configured from an inner-bag forming sheet member 41, which is the innermost-layer sheet member among the one or plurality of sheet members.

The shape of the inner bag 40 is not specifically limited. However, in the case of this embodiment, the inner bag 40 is formed into a shape similar to that of the container body 20.

As illustrated in FIG. 5, the inner bag 40 has a first main surface portion 40*a* located on the front surface side and a second main surface portion 40*b* located on the back side, with the containing region 17 therebetween.

The sheet material container 100 includes, for example, a spout member 15 that is provided so as to penetrate the top gusset portion 14, and a cap portion 70 that is attached (for example, detachably attached) to the spout member 15.

More specifically, as illustrated in FIGS. 2 and 3, for example, the spout member 15 is configured so as to integrally include a cylindrical outlet cylinder portion 15*a* through which the contents 18 pass, and a plate-like plate shape portion 15*b* provided in an arrangement orthogonal to the axial direction at one end (lower end) in the axial direction of the outlet cylinder portion 15*a*. A screw thread is formed on the outer peripheral surface of the outlet cylinder portion 15*a*, and the outlet cylinder portion 15*a* has a male thread shape. The outlet cylinder portion 15*a* penetrates the top gusset portion 14 vertically and protrudes upward from the top gusset portion 14.

The plate shape portion 15*b* is flanged out from the lower end of the outlet cylinder portion 15*a* toward the periphery. The planar shape of the plate shape portion 15*b* is not specifically limited, but may also be a substantially square shape, for example (FIG. 3).

The plate shape portion 15*b* is provided, for example, on the inner or outer surface of the portion of the inner-bag forming sheet member 41 that is disposed along the top gusset portion 14 of the body portion 11. The plate shape portion 15*b* is, for example, attached to the inner surface (lower surface) of the inner-bag forming sheet member 41 at the top gusset portion 14. Hence, the plate shape portion 15*b* is attached to the main-body forming sheet member 21 via the inner-bag forming sheet member 41. However, the present invention is not limited to or by this example, and the plate shape portion 15*b* may be directly attached to the inner film layer 23 of the main-body forming sheet member 21. The attached region between the plate shape portion 15*b* and the inner-bag forming sheet member 41 circumferentially surrounds the outlet cylinder portion 15*a* in plane view. The attached region between the plate shape portion 15*b* and the inner-bag forming sheet member 41 is formed, for example, in the region overlapping the annular main-body sealing portion 26 (see FIG. 8) located around the insert hole 21*a*.

The opening 15*c* at the tip of the outlet cylinder portion 15*a* is a discharge port for discharging the contents 18 from the containing region 17. The plate shape portion 15*b* has an opening 15*d* formed that is coaxial with the inner space of the outlet cylinder portion 15*a*. The contents 18 in the containing region 17 is discharged to the outside through the openings 15*d* and 15*c*.

Thus, the second planar portion (top gusset portion 14) has a discharge port (opening 15*c*) for discharging the contents 18 from the containing region 17.

Furthermore, the second planar portion (top gusset portion 14) is provided with a plate shape portion 15*b* having an opening (opening 15*d*) that is connected to the discharge port (opening 15*c*), and the one or plurality of sheet members are attached to the plate shape portion 15*b*.

The cap portion 70 has, for example, a mounting portion 71, which is a female thread-shaped cylindrical portion that is detachably screwed onto the outlet cylinder portion 15*a*, a pump portion 72 that is fixed to the mounting portion 71, a dip tube 77 that extends downward from the pump portion 72, and a head portion 73 held by the pump portion 72 that can be raised and lowered with respect to the pump portion 72.

The head portion 73 has, for example, a support cylinder portion 74 that projects upward from the pump portion 72, and a nozzle portion 75 that projects horizontally from the upper end of the head portion 73, and a discharge port 76 for discharging the contents 18 is formed at the tip of the nozzle portion 75.

The flow path (not shown in the drawings) of the contents 18 in the cap portion 70 is arranged so as to penetrate the openings 15*d* and 15*c* vertically.

When the head portion 73 is pushed (depressed) against the pump portion 72, the contents 18 are discharged from the discharge port 76 by the action of the pump portion 72.

In the case of this embodiment, the filling portion 60 includes, for example, a first filling portion 61 formed circumferentially along the peripheral edge portion of the first main surface portion 20*a*, a second filling portion 62 formed circumferentially along the peripheral edge portion of the second main surface portion 20*b*, a third filling portion 63 (FIG. 4) formed circumferentially along the peripheral edge portion of the bottom gusset portion 13, and a fourth filling portion 64 (FIG. 3) formed circumferentially around the outlet cylinder portion 15*a* in the top gusset portion 14, as illustrated in FIGS. 1 to 6.

The lower edge of the first filling portion 61 is connected to the front edge of the third filling portion 63, the lower edge of the second filling portion 62 is connected to the rear edge of the third filling portion 63, and the center of the top edge of the first filling portion 61 in the horizontal width direction is connected to the center of the front edge of the fourth filling portion 64 in the horizontal width direction.

The sheet material container 100 includes a filling portion 60 with such a structure, thereby securing sufficient structural strength over almost the entire container body 20.

In the case of this embodiment, the entire filling portion 60 is formed in an integrated manner.

Note that, in the present invention, the sheet material container 100 may include a plurality of filling portions 60 that are independent of each other.

Here, the connecting portion between the first filling portion 61 and the fourth filling portion 64, the connecting portion between the first filling portion 61 and the third filling portion 63, and the connecting portion between the second filling portion 62 and the third filling portion 63 are interfacial connecting portions 65, respectively.

In the case of this embodiment, the container body 20 has a body portion 11 and a top portion (top gusset portion 14), and one main surface portion of the body portion 11 (the first main surface portion 20*a*) is the first planar portion, and the top portion is the second planar portion.

Further, the filling portion 60 has a first filling portion 61 formed along the peripheral edge portion of the main surface portion (first main surface portion 20*a*) and a fourth filling portion 64 formed around the discharge port in the top portion (top gusset portion 14), and the first filling portion 61 and the fourth filling portion 64 are connected via the interfacial connecting portion 65.

Moreover, in the case of this embodiment, the container body 20 has a body portion 11 and a bottom portion (bottom gusset portion 13). One main surface portion of the body portion 11 (first main surface portion 20*a*) is the first planar portion, and the bottom portion (bottom gusset portion 13) is also the second planar portion.

Further, the filling portion 60 has a first filling portion 61 formed along the peripheral edge portion of the main surface portion (first main surface portion 20*a*) and a third filling portion 63 formed along the peripheral edge portion of the bottom portion (bottom gusset portion 13), and the first filling portion 61 and the third filling portion 63 are connected via an interfacial connecting portion 65.

Furthermore, in this embodiment, the other main surface portion of the body portion 11 (second main surface portion 20*b*) and the bottom portion (bottom gusset portion 13) also have a relationship with the first and second planar portions.

Thus, the plurality of planar portions that the container body 20 has include a first planar portion and a second planar portion that are adjacent to each other, and the filling portion 60 includes an interfacial connecting portion 65 that is disposed so as to straddle the first planar portion and the second planar portion across the boundary between the first planar portion and the second planar portion.

Figure 7:
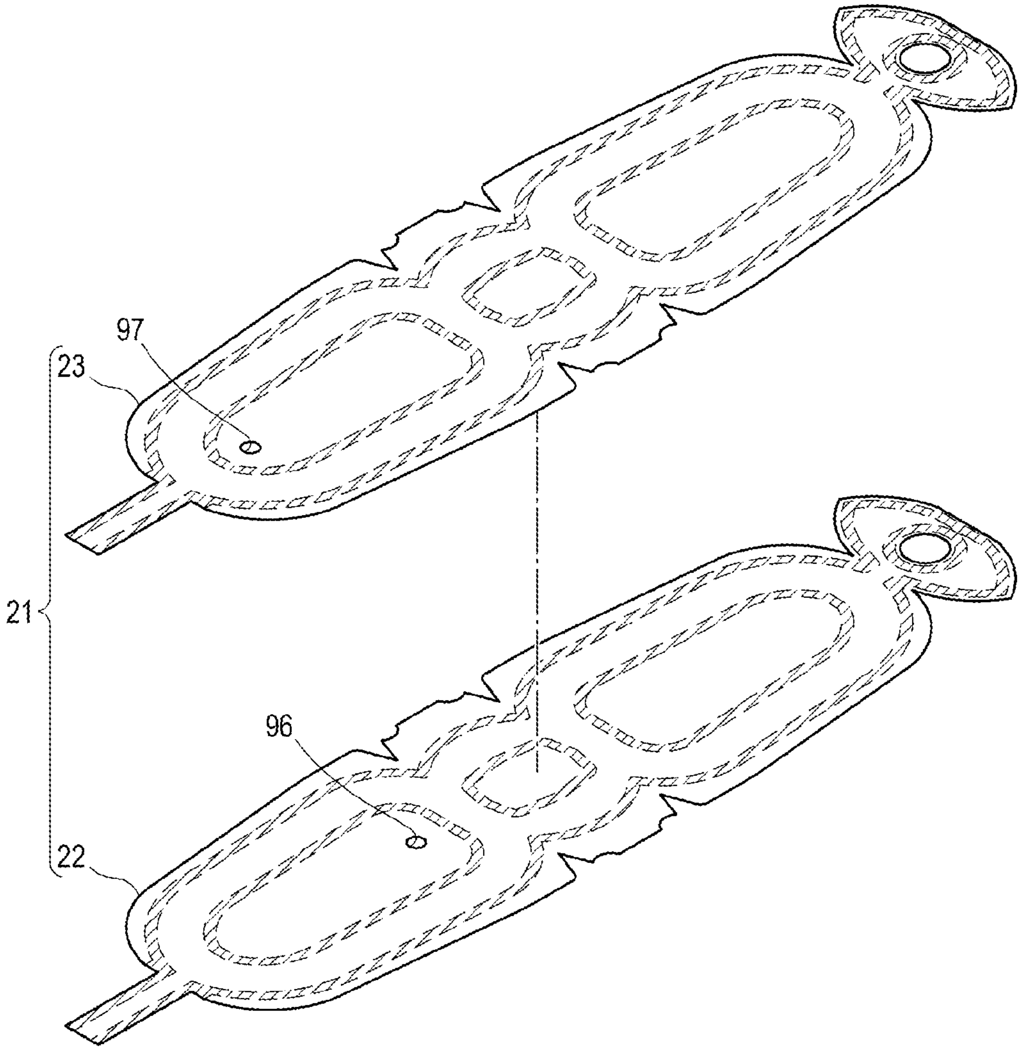
FIG. 7 is an exploded perspective view illustrating an outer film layer and an inner film layer of a main-body forming sheet member.

As illustrated in FIGS. 7 and 8, the main-body forming sheet member 21 is configured by mutually stacking and attaching the outer film layer 22, which forms the outer side of the container body 20, and the inner film layer 23, which forms the inner side of the container body 20. That is, as an example, in the case of this embodiment, the main-body forming sheet member 21 is configured from two film layers, namely the outer film layer 22 and the inner film layer 23. However, the present invention is not limited to or by this example, and the main-body forming sheet member 21 may have film layers other than the outer film layer 22 and the inner film layer 23.

In the case of this embodiment, the outer film layer 22 and the inner film layer 23 are formed in the same shape as each other. However, the present invention is not limited to or by this example, and the outer film layer 22 and the inner film layer 23 may be mutually different shapes. When different shapes, the outer film layer 22 preferably has a larger shape than the inner film layer 23.

An insert hole through which the outlet cylinder portion 15*a* of the spout member 15 is inserted is formed in the outer film layer 22 and the inner film layer 23.

The main-body forming sheet member 21 has a non-attached region 24 (FIG. 8) where the outer film layer 22 and the inner film layer 23 are partially not attached. For example, in one or both of the outer film layer 22 and the inner film layer 23, the surface facing the other is subjected to a partial non-attaching treatment. The non-attaching treatment can be easily formed by applying a non-attaching agent (a so-called adhesion inhibiting agent) to establish an adhesion inhibiting state. For the adhesion inhibiting agent, any adhesion inhibiting agent may be used as long as the same is capable of suppressing the attachment between the outer film layer 22 and the inner film layer 23. For the adhesion inhibiting agent, it is possible to preferably use, for example, printing ink, medium ink, ink dedicated to adhesion inhibition, or the like, which is used in offset printing, flexographic printing, and letterpress printing (relief printing). In addition, thermosetting ink or UV curable ink can be preferably used. The range in which the non-attaching treatment is applied is the non-attached region 24. A filler is enclosed in the non-attached region 24 to form the filling portion 60.

The filling portion 60 is not necessarily limited to being formed over the entire non-attached region 24, and may be formed in a portion of the non-attached region 24.

In FIG. 7, in each of the outer film layer 22 and the inner film layer 23, the regions that are mutually attached to form the main-body sealing portion 26 are hatched right side up for convenience.

Figure 9:
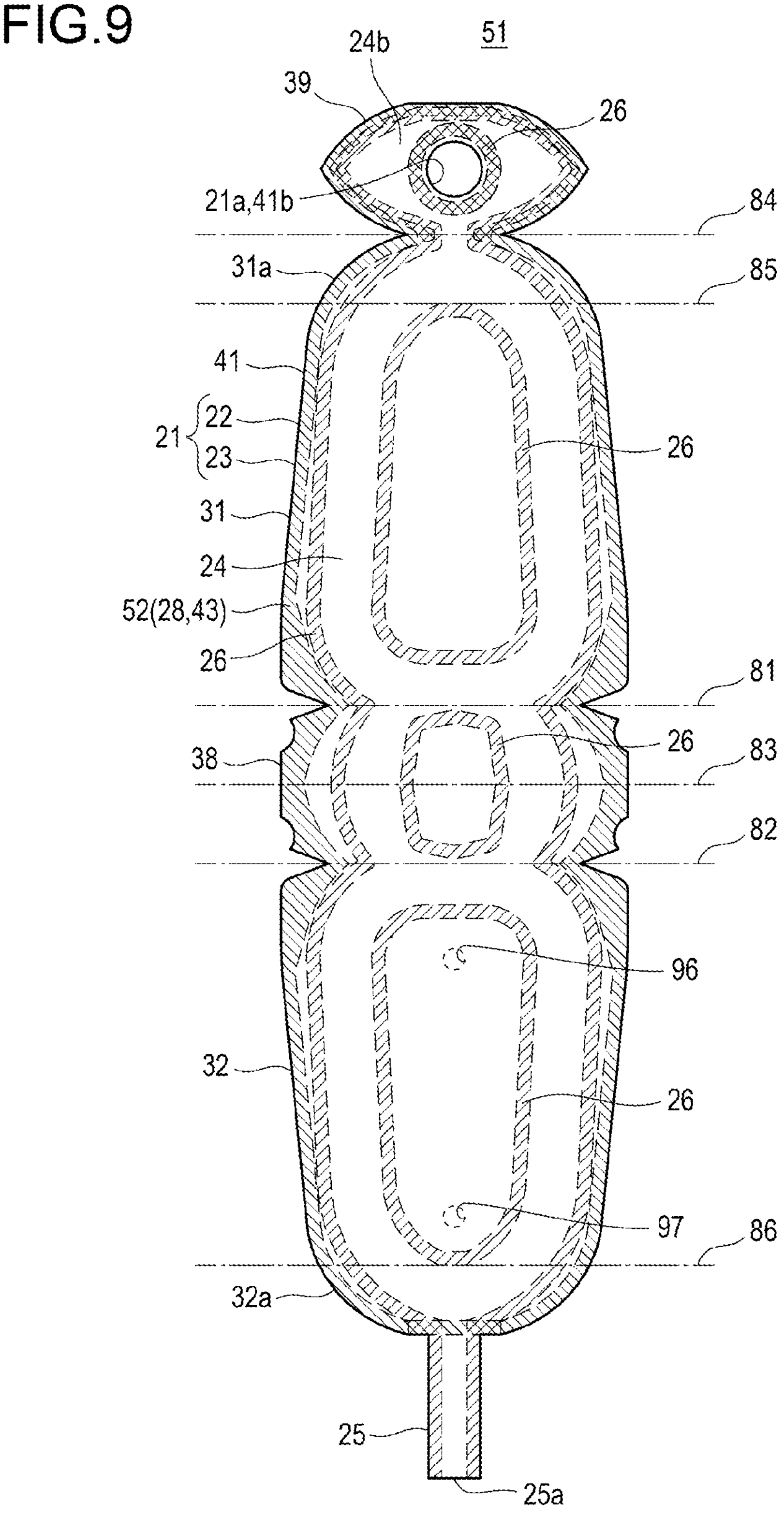
FIG. 9 is a plane view of a container forming sheet member, which has the inner-bag forming sheet member and the main-body forming sheet member which are mutually stacked.

In FIGS. 8 and 9, in the main-body forming sheet member 21, the region where the outer film layer 22 and the inner film layer 23 are mutually attached to define the non-attached region 24, that is, the region where the main-body sealing portion 26 is formed, is hatched right side up for convenience.

Furthermore, in FIG. 8, the seal boundary line 21*c*, which is the boundary line between the sealing region of the peripheral edge portion of the main-body forming sheet member 21 and other regions, is illustrated as a double-dotted chain line. In the case of this embodiment, in the region outside the seal boundary line 21*c* of the main-body forming sheet member 21, the outer film layer 22 and the inner film layer 23 are mutually attached during bag making, and the inner film layer 23 and the inner-bag forming sheet member 41 are mutually attached.

As an example, heat sealing, ultrasonic sealing, adhesive attaching, or the like, may be used as a method of attaching the outer film layer 22 and the inner film layer 23.

Furthermore, as illustrated in FIGS. 2, 7, 8 and 9, the outer film layer 22 and the inner film layer 23 of the main-body forming sheet member 21 have external air intake holes 96 and 97 through which air (external air) is taken in, between the container body 20 and the inner bag 40. The external air intake hole 96 is formed in the outer film layer 22, and the external air intake hole 97 is formed in the inner film layer 23. The external air intake holes 96 and 97 are located in mutually different positions, for example. As an example, as illustrated in FIG. 2, the external air intake hole 96 is located at the bottom of the second main surface portion 20*b* of the container body 20, and the external air intake hole 97 is located at the top of the second main surface portion 20*b* of the container body 20.

Thus, the sheet material container 100 has an inner bag 40 defining the containing region 17, the inner bag 40 being covered by the container body 20, and the main-body forming sheet member 21 has the external air intake holes 96, 97, through which external air is taken in, in the gap between the outer surface of the inner bag 40 and the inner surface of the container body 20.

In the case of this embodiment, each of the outer film layer 22 and the inner film layer 23 has a layered structure that includes a plurality of resin layers. The inner-bag forming sheet member 41 also has a layered structure that includes a plurality of resin layers.

The main-body forming sheet member 21 preferably includes a resin layer of one of the following types: polyethylene, polypropylene, polyester, and polyamide.

The materials of the resin layers forming the outer film layer 22 and the inner film layer 23 of the main-body forming sheet member 21 are not specifically limited, but include, for example, polyethylene materials such as high-density polyethylene (HDPE), medium-density polyethylene (MDPE), low-density polyethylene (LDPE), linear low-density polyethylene (LLDPE), ultra-low density polyethylene (ULDPE), and ethylene-vinyl alcohol copolymer (EVOH), or polypropylene materials such as oriented polypropylene (OPP), unoriented polypropylene (CPP), isotactic PP, syndiotactic PP, atactic PP, random PP, and block PP, or polyester materials such as polyethylene terephthalate (PET), amorphous polyethylene terephthalate (amorphous PET), polybutylene terephthalate (PBT), polyethylene naphthalate (PEN), and polybutylene naphthalate (PBN), or polyamide materials such as oriented nylon (ONy), unoriented nylon (CNy), nylon 6, nylon 66, nylon 11, nylon 12, and MXD6. Of these, the foregoing polyethylene-based materials are particularly preferable.

The outer film layer 22 has, as an example, a four-layer structure configured by stacking four resin layers, namely the first layer, the second layer, the third layer, and the fourth layer, in that order.

The first of these layers forms the outer surface of the container body 20. The first layer is composed of polyethylene terephthalate (PET) or oriented nylon (ONy), for example. Examples of the main function of the first layer include providing the container body 20 with a feeling of gloss and printability, and also securing rigidity for the container body 20.

The second layer is, for example, a layer of transparent deposition PET including polyethylene terephthalate obtained through vapor deposition of silica and/or alumina on the surface of this second layer on the first layer side. Examples of the main function of the second layer include providing the container body 20 with a gas barrier property.

The third layer is composed of oriented nylon, for example. Examples of the main function of the third layer include securing pinhole resistance for the container body 20.

The fourth layer is composed of linear low-density polyethylene (LLDPE), for example. Examples of the main function of the fourth layer include securing a heat seal property with the inner film layer 23.

Examples of the layer structure of the inner film layer 23 include a structure that includes a fifth layer composed of linear low-density polyethylene (LLDPE), for example, in addition to the same layer structure as the first through fourth layers of the outer film layer 22. The fifth layer is adjacent to the first layer and forms the surface on the opposite side to the fourth layer in the inner film layer 23. Examples of the main function of the fifth layer include securing a heat seal property with the outer film layer 22.

Examples of the main function of the fourth layer of the inner film layer 23 include securing a heat seal property with the inner-bag forming sheet member 41.

However, the layer structure of the outer film layer 22 and the inner film layer 23 is not limited to or by the foregoing examples, nor are the materials of each layer forming the outer film layer 22 and the inner film layer 23 limited to or by the foregoing examples.

As one example, the inner-bag forming sheet member 41 that forms the inner bag 40 has a three-layer structure configured by stacking a first layer, a second layer, and a third layer in this order.

Of these layers, the first layer is composed of linear low-density polyethylene, for example. Examples of the main function of the first layer include securing a heat seal property with the main-body forming sheet member 21 (a heat seal property with the inner film layer 23).

The second layer is, for example, a layer of transparent deposition oriented nylon composed of oriented nylon obtained through vapor deposition of silica and/or alumina on the surface of this second layer on the first layer side. Examples of the main function of the second layer include securing a gas barrier property and pinhole resistance.

The third layer is composed of linear low-density polyethylene, for example. Examples of the main function of the third layer include securing a heat seal property between inner-bag forming sheet members 41.

Note that the layer structure of the inner-bag forming sheet member 41 is not limited to or by the structure that has been described here.

As illustrated in FIGS. 8 and 9, the inner-bag forming sheet member 41 is stacked on the main-body forming sheet member 21. As illustrated in FIG. 9, the peripheral edge portion of the inner film layer 23 and the peripheral edge portion of the inner-bag forming sheet member 41 are mutually attached, and the peripheral edge portion of the outer film layer 22 and the peripheral edge portion of the inner film layer 23 are mutually attached. As a result, the container forming sheet member 51 is configured from the main-body forming sheet member 21 and the inner-bag forming sheet member 41.

Here, the sealing portion of the peripheral edge portion of the container forming sheet member 51 is referred to as the periphery sealing portion 52. The periphery sealing portion 52 includes a sealing portion between the peripheral edge portion of the inner film layer 23 and the peripheral edge portion of the inner-bag forming sheet member 41 (hereinafter referred to as the inner/outer sealing portion 43), and a sealing portion between the peripheral edge portion of the outer film layer 22 and the peripheral edge portion of the inner film layer 23 (hereinafter referred to as the main-body periphery sealing portion 28).

In FIG. 9, the region where the periphery sealing portion 52 is formed is marked with left-up hatching. Furthermore, in FIG. 9, in the region where the formation region of the periphery sealing portion 52 overlaps the formation region of the main-body sealing portion 26, the left-up hatching overlaps the right-up hatching.

As an example, heat sealing, ultrasonic sealing, adhesive attaching, or the like, may be used as a method for forming the periphery sealing portion 52.

As illustrated in FIG. 9, the main-body forming sheet member 21 has, for example, a first sheet portion 31, which is a portion that forms the first main surface portion 20*a*, a second sheet portion 32, which is the portion that forms the second main surface portion 20*b*, a bottom-gusset forming sheet portion 38, which is the portion that forms the bottom gusset portion 13, a top-gusset forming sheet portion 39, which is the portion that forms the top gusset portion 14, and the tubular extending portion 25. The extending portion 25 extends outward from the second sheet portion 32, for example.

The top gusset forming sheet portion 39 has an insert hole 21*a* through which the outlet cylinder portion 15*a* of the spout member 15 is inserted.

In the case of this embodiment, the non-attached region 24 is formed in a shape corresponding to the shape of the filling portion 60 of the sheet material container 100.

In the non-attached region 24, the portion 24*b* that becomes the fourth filling portion 64 is formed in a circumferential shape around the insert hole 21*a*, for example, as illustrated in FIG. 9. More specifically, for example, the outer edge (outline) of the portion 24*b* is smaller than the outline of the top-gusset forming sheet portion 39, and the inner edge of the portion 24*b* is circular, which is larger than the insert hole 21*a*.

In the case of this embodiment, the inner-bag forming sheet member 41 is formed in the same shape as the portion of the main-body forming sheet member 21 excluding the extending portion 25.

Note that, in FIG. 8, the seal boundary line 41*a* of the inner-bag forming sheet member 41 is illustrated using a double-dotted chain line for convenience. The seal boundary line 41*a* is a boundary line between the region where the inner-bag forming sheet member 41 is attached (sealed) with the main-body forming sheet member 21 and other regions in the inner-bag forming sheet member 41, and also between the region where the inner-bag forming sheet members 41 are attached together when the container forming sheet member 51 is used to form the sheet material container 100 and other regions in the inner-bag forming sheet member 41.

In the case of this embodiment, the position of the seal boundary line 41*a* and the position of the seal boundary line 21*c* correspond to each other (overlap each other).

In the inner-bag forming sheet member 41, an insert hole 41*b*, through which the outlet cylinder portion 15*a* of the spout member 15 is inserted, is formed in the portion overlapping the top-gusset forming sheet portion 39.

The plate shape portion 15*b* of the spout member 15 is, for example, attached against the inner surface of the portion overlapping the top-gusset forming sheet portion 39 in the inner-bag forming sheet member 41. The outlet cylinder portion 15*a* is caused to pass through the insert hole 41*b* of the inner-bag forming sheet member 41 and the insert hole 21*a* of the top-gusset forming sheet portion 39, and protrudes toward the outer surface side of these sheets.

In a state where the container forming sheet member 51 is valley-folded at the bending line 81, the bending line 82, and the bending line 84 illustrated in FIG. 9, and where the container forming sheet member 51 is mountain-folded at the bending line 83 and the bending line 85, the peripheral edge portions of the container forming sheet member 51 (the inner-bag forming sheet members 41) are attached to each other, whereby the container forming sheet member 51 is formed into a double-structured bag. Here, a valley fold is a convex fold toward the back in FIG. 9, and a mountain fold is a convex fold toward the front in FIG. 9.

In other words, the edges of the inner-bag forming sheet members 41 are attached together to form the inner-bag sealing portion 42 (see FIG. 1), the inner bag 40 thus being formed by the inner-bag forming sheet members 41 and thereby forming the bag-shaped container body 20 that covers the inner bag 40.

As an example, heat sealing, ultrasonic sealing, adhesive attaching, or the like, may be used as a method of attaching the inner-bag forming sheet members 41 together.

In the case of this embodiment, the main-body periphery sealing portion 28, the inner-bag sealing portion 42, and the inner/outer sealing portion 43 are located in positions so as to correspond to each other (in mutually overlapping positions). The main-body periphery sealing portion 28, the inner-bag sealing portion 42, and the inner/outer sealing portion 43 are collectively referred to as the periphery sealing portion 19 (the periphery sealing portion 19 includes the main-body periphery sealing portion 28, the inner-bag sealing portion 42, and the inner/outer sealing portion 43).

For this reason, in the case of this embodiment, the gusset periphery sealing strip 45 and the lateral sealing strip 46 are each configured to include the main-body periphery sealing portion 28, the inner-bag sealing portion 42 and the inner/outer sealing portion 43.

However, the present invention is not limited to or by this example, and the gusset periphery sealing strip 45 and the lateral sealing strip 46 may also be configured from only the main-body periphery sealing portion 28.

In the first sheet portion 31, the portion on the top-gusset forming sheet portion 39 side from the bending line 85 is the first overlapping portion 31*a*. The first overlapping portion 31*a* is disposed overlapping one half in the top-gusset forming sheet portion 39 in a state before the non-attached region 24 is filled with the filler.

The portion of the second sheet portion 32 that is located farther from the bottom-gusset forming sheet portion 38 than the bending line 86 is the second overlapping portion 32*a*. The second overlapping portion 32*a* is disposed overlapping the other half in the top-gusset forming sheet portion 39 in a state before the non-attached region 24 is filled with the filler.

Figure 10:
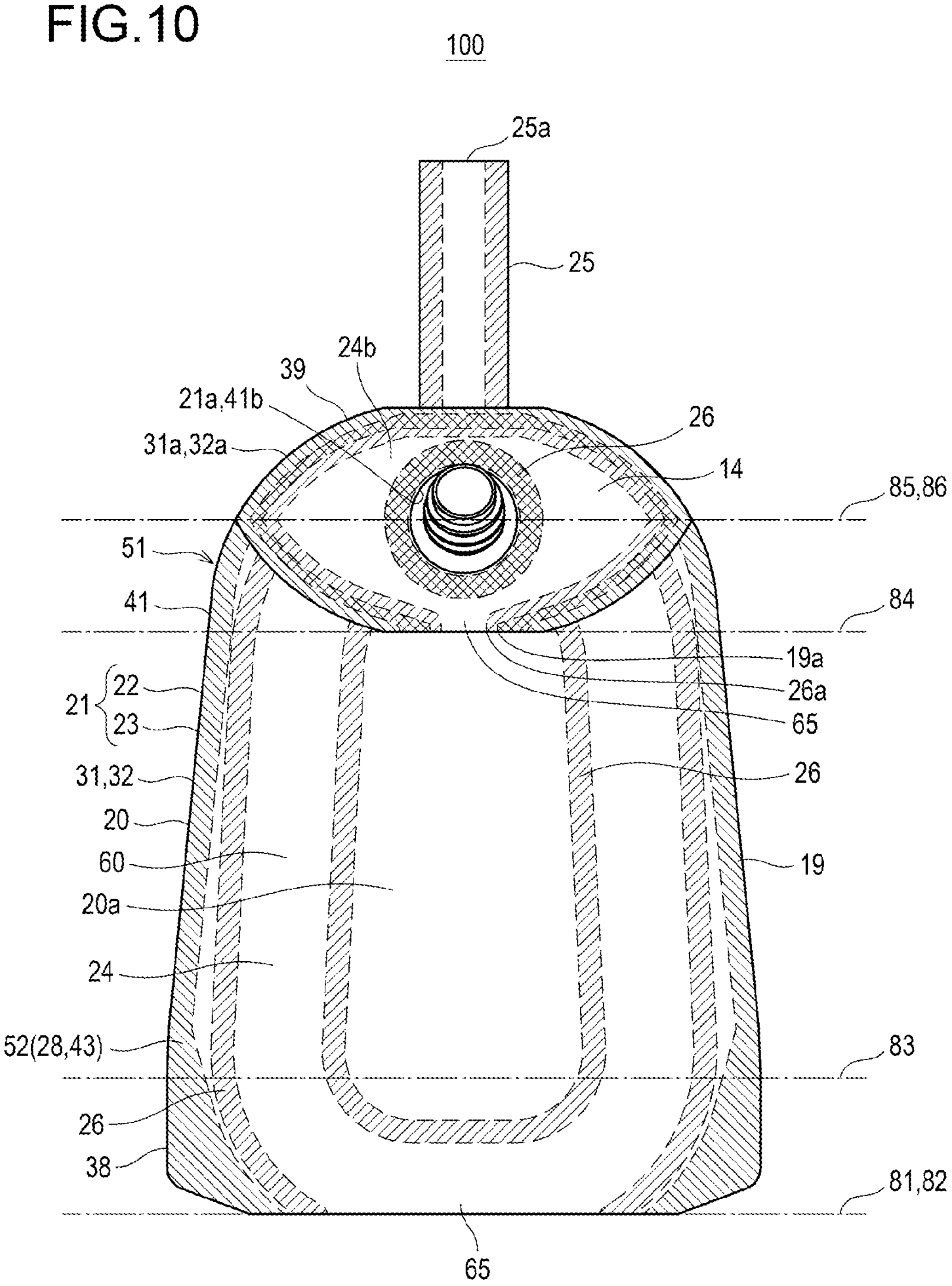
FIG. 10 is a plane view of the sheet material container before filler is enclosed.

Thus, as illustrated in FIG. 10, the container forming sheet member 51 is formed into a double bag shape to obtain the sheet material container 100. In the state illustrated in FIG. 10, the sheet material container 100 has a flat shape because the containing region 17 has not yet been expanded and the filling portion 60 has not been filled with filler.

Thus, the sheet material container 100 has a periphery sealing portion 19 in which one or a plurality of sheet members are bent along the bending lines 81 to 86 and in which portions of the peripheral edge portions of at least an innermost-layer sheet member (the inner-bag forming sheet member 41) among the one or plurality of sheet members are mutually attached. The container body 20 includes a plurality of planar portions. In the case of this embodiment, the container body 20 has four planar portions, namely the first main surface portion 20*a*, the second main surface portion 20*b*, the top gusset portion 14, and the bottom gusset portion 13.

In the sheet material container 100, for example, the filler is injected into the non-attached region 24 from the injection port 25*a* (FIG. 10) formed in the extending portion 25, and then the non-attached region 24 is sealed at the portion connected to the base end of the extending portion 25. The filler is thus enclosed in the non-attached region 24 (filling portion 60).

Note that the pressure within the filling portion 60 is not specifically limited. However, it is preferable that this pressure is higher than atmospheric pressure, and for example, may be set to be equal to or more than 10 kPa and equal to or less than 500 kPa (gauge pressure).

After the filler has been enclosed in the filling portion 60, for example, the extending portion 25 is cut away.

In this way, a sheet material container 100 (see FIGS. 1 to 6) is obtained with the filler enclosed in the filling portion 60. However, the extending portion 25 may remain uncut even in the state of the sheet material container 100 in which the filler is enclosed.

After making the sheet material container 100, the contents 18 are filled into the containing region 17 through the outlet cylinder portion 15*a* of the spout member 15, and then the cap portion 70 is mounted on the spout member 15 to obtain the sheet material container 100 with the contents 18 enclosed in the containing region 17.

Figure 12:
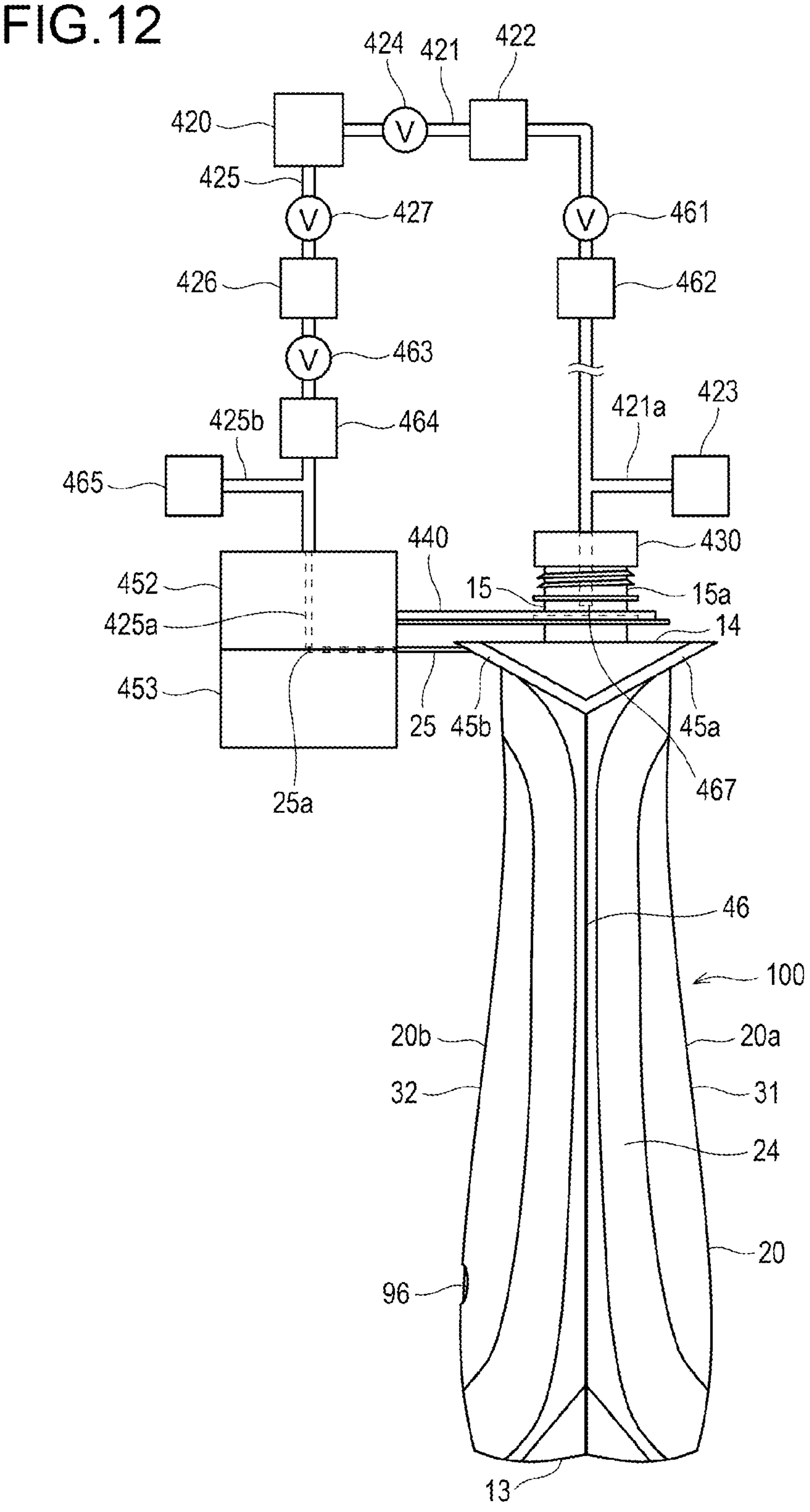
FIG. 12 is a diagram to illustrate the method for manufacturing a sheet material container according to the first embodiment and illustrating a state in which the expanding of the container body has been performed.
Figure 13:
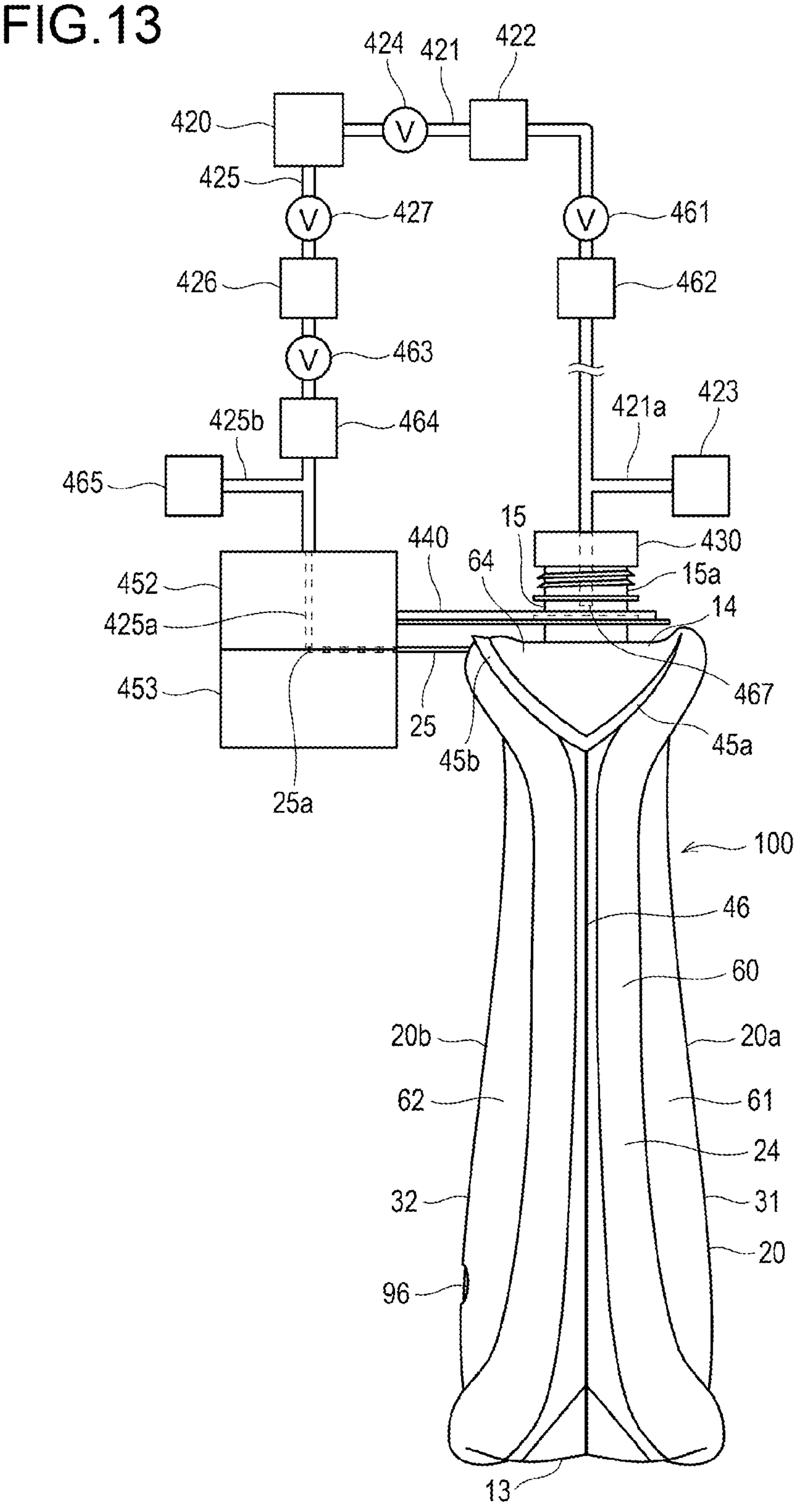
FIG. 13 is a diagram to illustrate the method for manufacturing a sheet material container according to the first embodiment and illustrating a state in which the injecting of filler has been performed.

The injecting of filler into the filling portion 60 will be described hereinbelow in more detail using FIGS. 11 through 13. Note that FIGS. 11 to 13 illustrate the structure of the sheet material container 100 as viewed from the side (left side).

Figure 11:
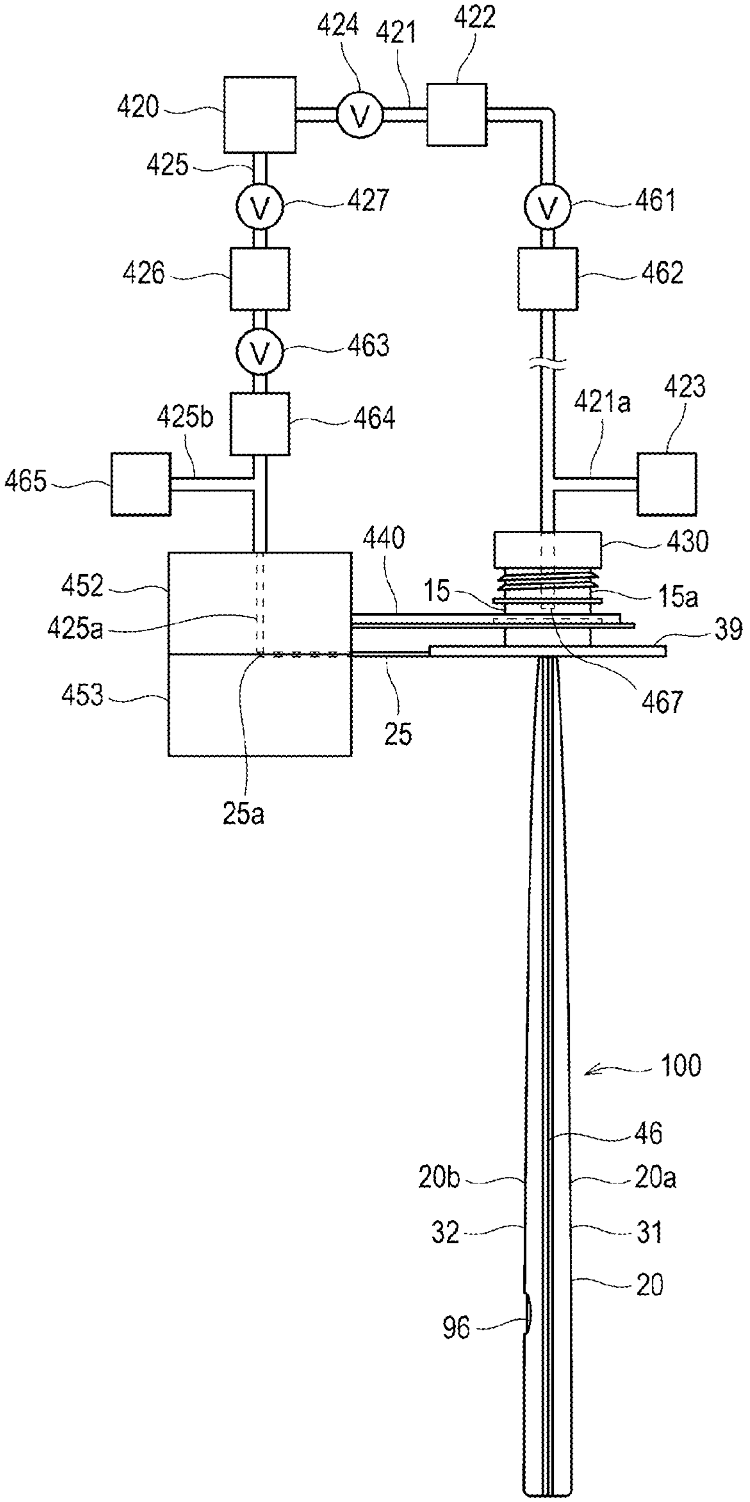
FIG. 11 is a diagram to illustrate a method for manufacturing a sheet material container according to a first embodiment and illustrating a state before performing the expanding of the container body.

First, the sheet material container 100 is placed in the manufacturing apparatus illustrated in FIG. 11.

This manufacturing apparatus includes, for example, a gas supply source 420 for supplying gas (for example, air) and a first gas supply piping 421 for supplying gas from the gas supply source 420 to the containing region 17 (see FIG. 5). The first gas supply piping 421 has, for example, a first regulator 422 located near the gas supply source 420, a first switch valve 461 located downstream of the first regulator 422, a first speed controller 462 (flow speed control valve) located downstream of the first switch valve 461, a stopper member 430 that closes the tip of the spout member 15, and a first valve 424 located between the first regulator 422 and the gas supply source 420. The stopper member 430 may be a cap member that closes the tip of the spout member 15, a rubber stopper, or packing. The tip of the first gas supply piping 421 penetrates the stopper member 430 and is held by the stopper member 430, and is inserted into the inside of the outlet cylinder portion 15*a* of the spout member 15 or into the containing region 17. The tip of the first gas supply piping 421 is a gas supply port 467 that supplies gas to the containing region 17. In other words, the gas supply port 467 is provided to the stopper member 430. The first gas supply piping 421 has, for example, a first branch piping 421*a* branching in the vicinity of the stopper member 430, and the first branch piping 421*a* is provided with a first pressure gauge 423. Note that the order of arrangement of each component in the first gas supply piping 421 is not limited to or by the foregoing example, and any other order may be used as long as the operation described subsequently can be realized.

The manufacturing apparatus is further provided with, for example, a second gas supply piping 425 for supplying gas from the gas supply source 420 into the filling portion 60, a holding member 440 for holding the outlet cylinder portion 15*a* of the spout member 15, and a first holding block 452 and a second holding block 453 for sandwiching the extending portion 25. The second gas supply piping 425 has, for example, a second regulator 426, a second switch valve 463 located downstream of the second regulator 426, a second speed controller 464 (flow speed control valve) located downstream of the second switch valve 463, and a second valve 427 located between the second regulator 426 and the gas supply source 420. The tip 425*a* of the second gas supply piping 425 is buried, for example, in the first holding block 452. The second gas supply piping 425 has, for example, a second branch piping 425*b* branching off in the vicinity of the first holding block 452, and a second pressure gauge 465 is provided to the second branch piping 425*b*. Note that the order in which the components are arranged in the second gas supply piping 425 is not limited to or by the foregoing example, rather, any other order may be used as long as the operation described subsequently can be realized.

By holding the outlet cylinder portion 15*a* of the spout member 15 by using the holding member 440, sandwiching the extending portion 25 between the first holding block 452 and the second holding block 453, and mounting the stopper member 430 on the spout member 15, the sheet material container 100 is placed in the manufacturing apparatus.

In this state, the tip of the spout member 15 is closed by the stopper member 430. The distal end of the tip 425*a* of the second gas supply piping 425 is located at a position corresponding to the injection port 25*a* of the extending portion 25.

After placing the sheet material container 100 in the manufacturing apparatus, the introducing of gas into the containing region 17 and expanding the container body 20 (see FIG. 12), and the injecting of the filler between the layers of the outer film layer 22 and the inner film layer 23 in the non-attached region 24 in a state where the container body 20 has been expanded (see FIG. 13), are performed.

The sheet material container 100 in this embodiment enters a state of being bent along the bending lines 81 to 86, as illustrated in FIG. 10. When filling with filler is attempted in this state, the portion intersecting the bending lines 81, 82, and 84 (interfacial connecting portion 65) in the non-attached region 24 and the portion intersecting the bending line 83 in the non-attached region 24 tend to be blocked, which is likely to prevent smooth distribution of the filler. In contrast, by providing the expanding of the container body 20 as per this embodiment, and injecting the filler in a state where the container body 20 has been expanded, blockage of the non-attached region 24 (blockage of the interfacial connecting portion 65) during the filling with the filler can be suppressed, thereby facilitating the injection of the filler. Moreover, it is also possible to fill the containing region 17 with a sufficient amount of contents 18, and the reproducibility of the volume (full volume) of the containing region 17 becomes favorable.

Here, the state in which the container body 20 has been expanded is different from the state in which the sheet material container 100 is bent and there is practically no gas present in the containing region 17 (FIG. 10), and in a state in which gas is introduced into the containing region 17 to a certain extent, the pressure in the containing region 17 in a state where the container body 20 has been expanded may be either in a positive pressure state or an atmospheric pressure state.

In particular, in a sheet material container 100 having an inner bag 40 as this embodiment, because the introducing of gas into the containing region 17 and expanding the container body 20 are provided, wrinkles formed in the inner bag 40 are reduced when the inner bag 40 is filled with the contents 18, thus resulting in a good appearance.

More specifically, for example, when the manufacturing apparatus is operating, the first valve 424 is always open, and by opening the first switch valve 461, gas can be supplied from the gas supply source 420 into the containing region 17 to expand the container body 20, as illustrated in FIG. 12. In other words, in the case of this embodiment, expanding of the container body 20 is performed by blowing gas into the containing region 17.

By expanding the container body 20, there is a transition from a state where the first sheet portion 31, which is the portion that forms the first main surface portion 20*a*, and the second sheet portion 32, which is the portion that forms the second main surface portion 20*b*, are in close proximity as illustrated in FIG. 11, to a state where the first sheet portion 31 and the second sheet portion 32 are sufficiently separated and the bottom gusset portion 13 is developed, as illustrated in FIG. 12. In other words, the angle with which the portions along each bending line 81, 82, 83, 84 (FIG. 10) of the container forming sheet member 51 are folded becomes less acute. More specifically, in the state in FIG. 11, the container forming sheet member 51 is folded back by about 180 degrees at the portions along each of the bending lines 81, 82, 83, 84, and the portions of the container forming sheet member 51 on both sides of the bending lines 81, 82, 83, and 84 therebetween are substantially in close contact or face-to-face contact. In contrast, in the state in FIG. 12, the portions of the container forming sheet member 51 on both sides of the bending lines 81, 82, 83, and 84 are separated from each other, and the angle therebetween is widened (for example, widened to about 90 degrees).

Thus, the sheet material container 100 has a mouth portion (for example, an opening at the tip of the spout member 15) with which the contents are poured out from the containing region 17, and the expanding of the container body 20 is preferably performed by closing the mouth portion using a stopper member 430 and blowing gas into the containing region 17 from the gas supply port 467 provided to the stopper member 430. The filling of the containing region 17 with gas can accordingly be performed favorably.

Furthermore, in the expanding of the container body 20, when the internal pressure of the first regulator 422 (the setting value of the first regulator 422) is set high in order to increase the flow rate of the gas when the mouth portion is plugged using the stopper member 430, rupture of the container body 20 or the inner bag 40 is likely to occur. In such a case, the rupture of the container body 20 or the inner bag 40 can be suppressed by not completely closing the mouth portion with the stopper member 430, and providing a slight gap between the mouth portion and the stopper member 430 to intentionally allow the supplied gas to leak.

Further, when the manufacturing apparatus is operating, the second valve 427 is always open. Next, by opening the second switch valve 463, gas can be injected from the gas supply source 420 through the second gas supply piping 425 into the filling portion 60 from the injection port 25*a* of the extending portion 25. The filling portion 60 thus expands, as illustrated in FIG. 13.

Next, sealing of the filling portion 60, that is, sealing of the non-attached region 24, for example, at the portion that connects to the base end of the extending portion 25, is performed.

Here, in the case of this embodiment, for example, expanding of the container body 20 is performed in a state where the peripheral edge portions of the foregoing one or plurality of sheet members are not attached at a portion in the extending direction of the periphery sealing portion 19.

More specifically, for example, the position of the main-body forming sheet member 21 that overlaps the point where the extending portion 25 is formed is non-attached. More specifically, the position in which the main-body forming sheet member 21 overlaps the base end of the extending portion 25 is non-attached.

In addition, the expanding of the container body 20 is carried out in a state where the position in which the main-body forming sheet member 21 overlaps the part where the extending portion 25 is formed is non-attached. In other words, an extending portion 25 that extends outwardly is formed on the main-body forming sheet member 21, and the extending portion 25 has an injection port 25*a* with which the filler is injected, and in the position of overlapping with the extending portion 25 (at the stage of performing the expanding of the container body 20), the peripheral edge portions of the foregoing one or plurality of sheet members are not attached.

Using this structure of the sheet material container 100, when the container body 20 is expanded by blowing gas into the containing region 17, the concentration of stress on the periphery sealing portion 19 can be suppressed.

In particular, when the expanding of the container body 20 is performed in a state where the mouth portion is plugged with the stopper member 430, setting the internal pressure of the regulator high to increase the flow rate will likely cause the container body 20 or inner bag 40 to rupture. However, by partially not attaching the peripheral edge portions of one or a plurality of sheet members, the load on the periphery sealing portion does not become too large, and rupture of the container body 20 or inner bag 40 can be suppressed.

Moreover, because the points at which the peripheral edge portions of the one or plurality of sheet members are not attached are formed in a position overlapping the extending portion 25, the points at which there is non-attachment at the same time as the filling portion 60 is sealed can be attached in the sealing of the filling portion 60. In other words, the method for manufacturing a sheet material container according to this embodiment includes: sealing of the filling portion 60 after the injecting of the filler, wherein, in the sealing of the filling portion 60, the points at which the peripheral edge portions of the one or plurality of sheet members are not attached are attached at the same time as the filling portion 60 is sealed.

Here, when injecting gas into the filling portion 60, the inside of the containing region 17 is preferably held at a higher pressure than atmospheric pressure by the pressure of the gas supplied to the containing region 17 from the gas supply source 420 via the first gas supply piping 421. In other words, it is preferable to perform the injecting of the filler while holding the inside of the containing region 17 in a positive pressure state. Because the formation of wrinkles in the filling portion 60 can accordingly be suppressed, a filling portion 60 that is difficult to buckle can be formed, and the sheet material container 100 can be afforded a favorable appearance.

By setting the setting value of the first regulator 422 so that the indicated value of the first pressure gauge 423 is greater than atmospheric pressure, the inside of the containing region 17 can be held in a positive pressure state.

By way of an example, the setting value of the first regulator 422 is set so that the difference between the indicated value of the first pressure gauge 423 and atmospheric pressure is equal to or more than 0.1 kPa and equal to or less than 500 kPa. In other words, the difference between the pressure of the containing region 17 in the foregoing positive pressure state and atmospheric pressure is preferably equal to or more than 0.1 kPa and equal to or less than 500 kPa.

The setting value of the first regulator 422 is preferably set at equal to or more than 1 kPa and equal to or less than 1000 kPa. That is, in the expanding of the container body 20, it is preferable to set the set gauge pressure of the regulator (first regulator 422) on the supply source side to equal to or more than 1 kPa and equal to or less than 1000 kPa when supplying the gas from the supply source (gas supply source 420) to the containing region 17.

Further, it is preferable to use the first regulator 422 or the first speed controller 462 to blow the gas into the containing region 17 while gradually reducing the flow rate of the gas. In this way, the load on the containing region 17 and so forth of the sheet material container 100 can be suppressed.

Here, the gas flow rate may be reduced continuously or may be reduced in steps.

Further, it is preferable to use the second regulator 426 or the second speed controller 464 to perform the injecting of the filler while gradually reducing the flow rate of the filler. In this way, the load on the filling portion 60 and so forth of the sheet material container 100 can be suppressed.

Here, the flow rate of the filler may be reduced continuously or may be reduced in steps.

The sealing of the filling portion is preferably performed after a positive pressure state inside the containing region 17 is released. In other words, it is preferable to perform the sealing of the filling portion after restoring the inside of the containing region 17 to atmospheric pressure, or at a low pressure close to atmospheric pressure. In this way, the injection pressure of the filler (for example, air) into the filling portion 60 can be easily controlled. Methods for releasing the positive pressure state include, but are not limited to, closing the first valve 424, or setting the first regulator 422 to 0 kPa, or opening the mouth portion plugged by the stopper member 430.

Further, the filling of the containing region 17 with the contents 18 is performed in a state where the filler has been enclosed in the filling portion 60 by the injecting of the filler.

More specifically, after enclosing the filler in the filling portion 60 (filling the filler into the filling portion 60 and sealing the filling portion 60) as described above, for example, the contents 18 is filled into the containing region 17 through the outlet cylinder portion 15*a* of the spout member 15 as described earlier.

The filling with the contents 18 may be carried out before the injecting of filler.

The sheet material container 100 may also be formed with an easy-peel region where the inner surface of the container body 20 and the outer surface of the inner bag 40 can be easily peeled. The easy-peel region is a region where the peel strength required to peel off the inner surface of the container body 20 and the outer surface of the inner bag 40 is low. In other words, the peel strength between the inner surface of the container body 20 and the outer surface of the inner bag 40 in the easy-peel region is smaller than the peel strength between the inner surface of the container body 20 and the outer surface of the inner bag 40 in the periphery sealing portion 52 (inner/outer sealing portion 43).

The inner surface of the container body 20 and the outer surface of the inner bag 40 can thus be maintained in a state of mutual close contact even when a certain time has elapsed after the expanding of the container body 20 and until the injecting of the filler is started. Therefore, when injecting the filler into the filling portion 60, external air can be prevented from being introduced into the gap between the outer surface of the inner bag 40 and the inner surface of the container body 20 via the external air intake holes 96 and 97, whereby the reproducibility of the volume (full volume) of the containing region 17 becomes more favorable. In addition, the wrinkles formed in the inner bag 40 after filling with the contents are reduced, thus resulting in a more favorable appearance.

Here, the easy-peel region is formed by mutually attaching the inner surface of the container body 20 and the outer surface of the inner bag 40 in a state that enables easy peeling. The easy-peel region can be formed, for example, through attachment using an adhesive with low adhesive strength or through partial attaching. The easy-peel region may be achieved by heat-sealing at low temperatures or may be achieved by reducing the seal strength (attachment strength) using a corona treatment and then heat-sealing. Alternatively, an easy-peel region may also be formed on the inner surface of the container body 20 or the outer surface of the inner bag 40 by using a sheet member with easy-peel properties.

The easy-peel region may also be formed by causing the inner surface of the container body 20 to come into close contact with the outer surface of the inner bag 40 under an electrostatic force. By imparting a positive charge or a negative charge to the container body 20 and/or the inner bag 40, the inner surface of the container body 20 and the outer surface of the inner bag 40 can be brought into close contact under an electrostatic force. Methods of imparting a positive charge or a negative charge to the container body 20 and/or the inner bag 40 are not specifically limited; however, a method that is performed using an electrostatic gun, a method that is performed using charging by friction, or a method of reducing the antistatic agent contained in the film, is used.

The easy-peel region may also be formed through pseudo-attaching of the inner surface of the container body 20 to the outer surface of the inner bag 40.

One example of pseudo-attaching is a configuration in which the outermost (inner film layer 23 side) layer of the inner-bag forming sheet member 41 is linear low-density polyethylene, and the innermost (inner-bag forming sheet member 41 side) layer of the inner film layer 23 is polyethylene terephthalate (PET). Then, by crimping the main-body forming sheet member 21 and the inner-bag forming sheet member 41, the surface of the inner film layer 23 on the inner-bag forming sheet member 41 side (for example, composed of PET) and the surface of the inner-bag forming sheet member 41 on the inner film layer 23 side (for example, composed of linear low density polyethylene) can be pseudo-attached.

In the case of this configuration, the outer film layer 22 is formed one size larger than the inner film layer 23, and, in the main-body forming sheet member 21, the peripheral edge portion of the outer film layer 22 protrudes from the outer periphery of the inner film layer 23. When the main-body forming sheet member 21 and the inner-bag forming sheet member 41 are mutually heat-sealed to form the container forming sheet member 51, for example, the entire surface of the main-body forming sheet member 21 and the entire surface of the inner-bag forming sheet member 41 are pressed (full-face pressing) using a press die to crimp the inner film layer 23 to the inner-bag forming sheet member 41, thereby forming an easy-peel region, and the peripheral edge portion of the outer film layer 22 and the peripheral edge portion of the inner-bag forming sheet member 41 are mutually attached to form the periphery sealing portion 19. To improve the adhesive strength of the pseudo-attaching, the press die is preferably heated during crimping.

Even in a state where the easy-peel region is formed by the inner surface of the container body 20 and the outer surface of the inner bag 40, the inner surface of the container body 20 and the outer surface of the inner bag 40 preferably come to be mutually detached when a force is applied to the inner bag 40 in a direction that causes the outer surface of the inner bag 40 to separate from the inner surface of the container body 20 due to a reduction in the amount of the contents 18 remaining in the containing region 17.

Second Embodiment

Figure 14B:
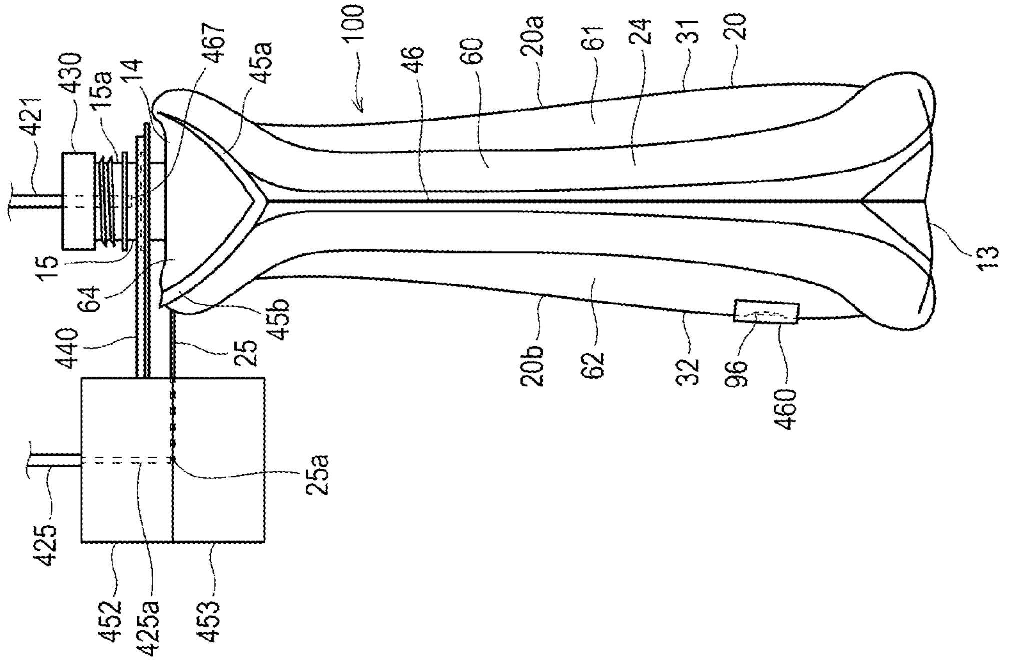
Figure 14A:
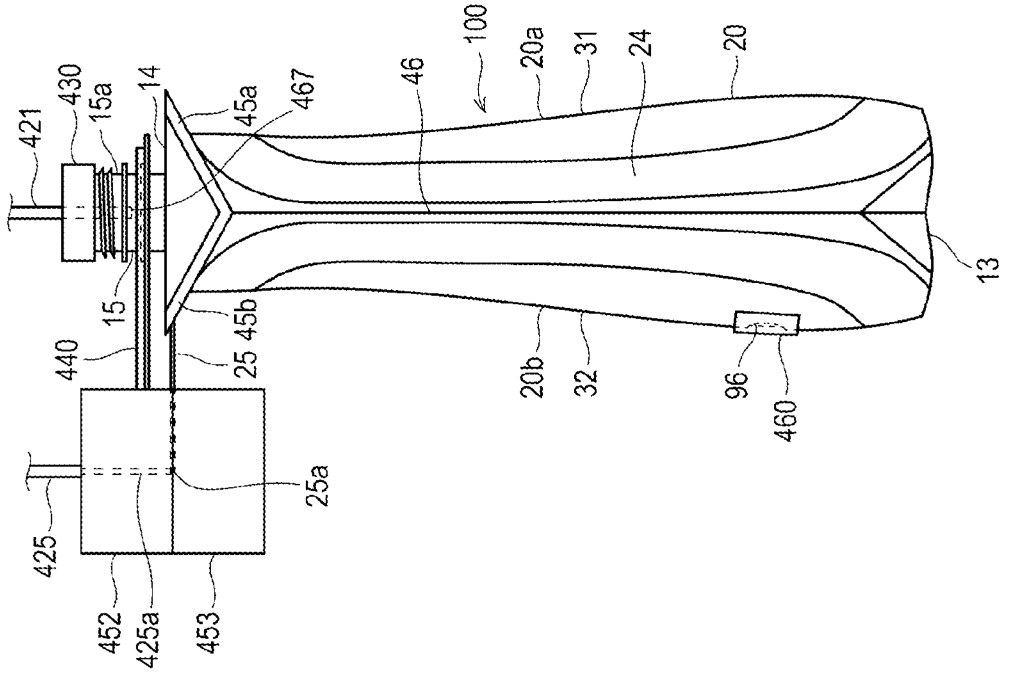

Next, a second embodiment will be described using FIGS. 14A and 14B.

The method for manufacturing a sheet material container according to this embodiment differs from the method for manufacturing a sheet material container according to the foregoing first embodiment in terms of the points described hereinbelow, and is otherwise configured in the same manner as the method for manufacturing a sheet material container according to the foregoing first embodiment.

In the case of this embodiment, the closing of the external air intake hole 96 (FIG. 14A) is performed after the expanding of the container body 20 (FIG. 12), and the injecting of the filler (FIG. 14B) is performed in a state where the external air intake hole 96 is closed.

Thus, when injecting the filler into the filling portion 60, external air can be prevented from being introduced into the gap between the outer surface of the inner bag 40 and the inner surface of the container body 20 via the external air intake holes 96 and 97, whereby the reproducibility of the volume (full volume) of the containing region 17 becomes more favorable. In addition, the wrinkles formed in the inner bag 40 after filling with the contents are reduced, thus resulting in a more favorable appearance.

The closing of the external air intake hole 96 (FIG. 14A) can be performed, for example, by closing the external air intake hole 96 using an adhesive tape 460. Closure of the external air intake hole 96 using the adhesive tape 460 means that the adhesive tape 460 is stuck to the circumferential portion around the external air intake hole 96 on the outer surface of the container body 20 so as to bring the same into contact with this portion in an airtight manner, thereby restricting the intake of external air into the gap between the outer surface of the inner bag 40 and the inner surface of the container body 20 via the external air intake hole 96.

After the filler is injected into the filling portion 60 and the filling portion 60 is sealed, the adhesive tape 460 is peeled off from the sheet material container 100, and the external air intake hole 96 is opened.

Third Embodiment

Next, a third embodiment will be described using FIGS. 15A and 15B.

The method for manufacturing a sheet material container according to this embodiment differs from the method for manufacturing a sheet material container according to the foregoing first embodiment in terms of the points described hereinbelow, and is otherwise configured in the same manner as the method for manufacturing a sheet material container according to the foregoing first embodiment.

In the case of this embodiment, after the expanding of the container body 20 (FIG. 12), vacuuming (FIG. 15A) of the gap between the outer surface of the inner bag 40 and the inner surface of the container body 20 through the external air intake hole 96, and injecting of the filler (FIG. 15B) are performed.

Thus, when injecting the filler into the filling portion 60, external air can be prevented from being introduced into the gap between the outer surface of the inner bag 40 and the inner surface of the container body 20 via the external air intake holes 96 and 97, whereby the reproducibility of the volume (full volume) of the containing region 17 becomes more favorable. In addition, the wrinkles formed in the inner bag 40 after filling with the contents are reduced, thus resulting in a more favorable appearance.

The vacuuming of the gap between the outer surface of the inner bag 40 and the inner surface of the container body 20 through the external air intake hole 96 (FIG. 15A) can be performed, for example, by vacuuming gas from the external air intake hole 96 through the suction piping 471 using a suction pump 472. A stopper member 470 for closing the external air intake hole 96 is provided at one end of the suction piping 471, a suction pump 472 is provided at the other end of the suction piping 471, and a valve 473, for example, is provided in the middle of the suction piping 471.

Here, closing the external air intake hole 96 with the stopper member 470 means bringing the stopper member 470 into close contact, in an airtight manner, with the circumferential portion around the external air intake hole 96 in the outer surface of the container body 20, and maintaining, in a state of mutual connection, the suction piping 471 and the gap between the outer surface of the inner bag 40 and the inner surface of the container body 20 through the stopper member 470, and the external air intake holes 96, and 97.

The vacuuming of the gap between the outer surface of the inner bag 40 and the inner surface of the container body 20 through the external air intake hole 96 can be performed by blocking the external air intake hole 96 using the stopper member 470 and opening the valve 473 in a state where the suction pump 472 is in operation, or by operating the suction pump 472 in a state where the valve 473 is open.

Figure 15B:
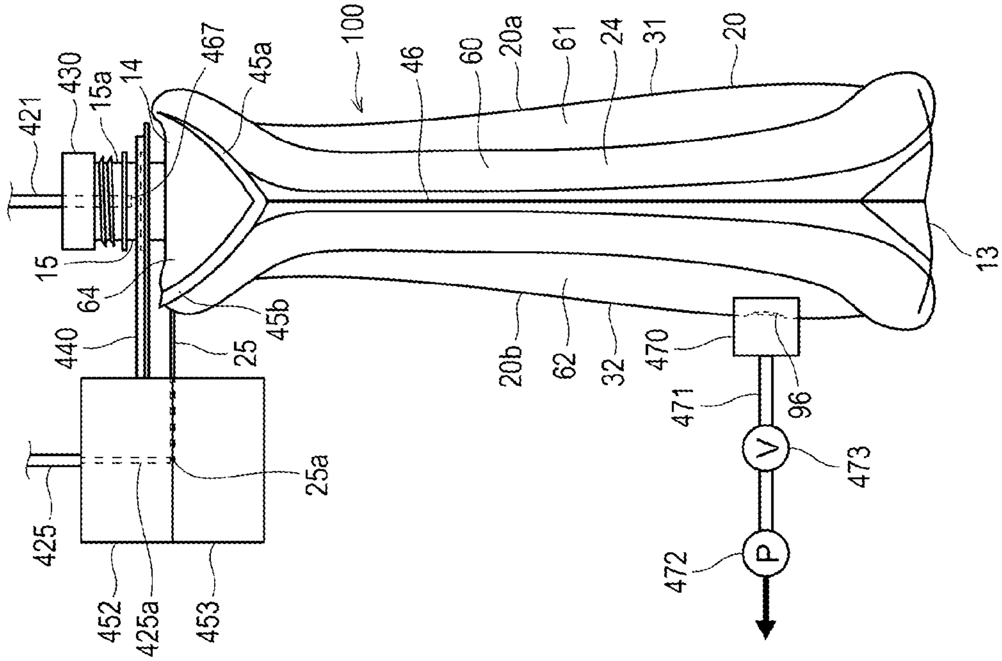
Figure 15A:
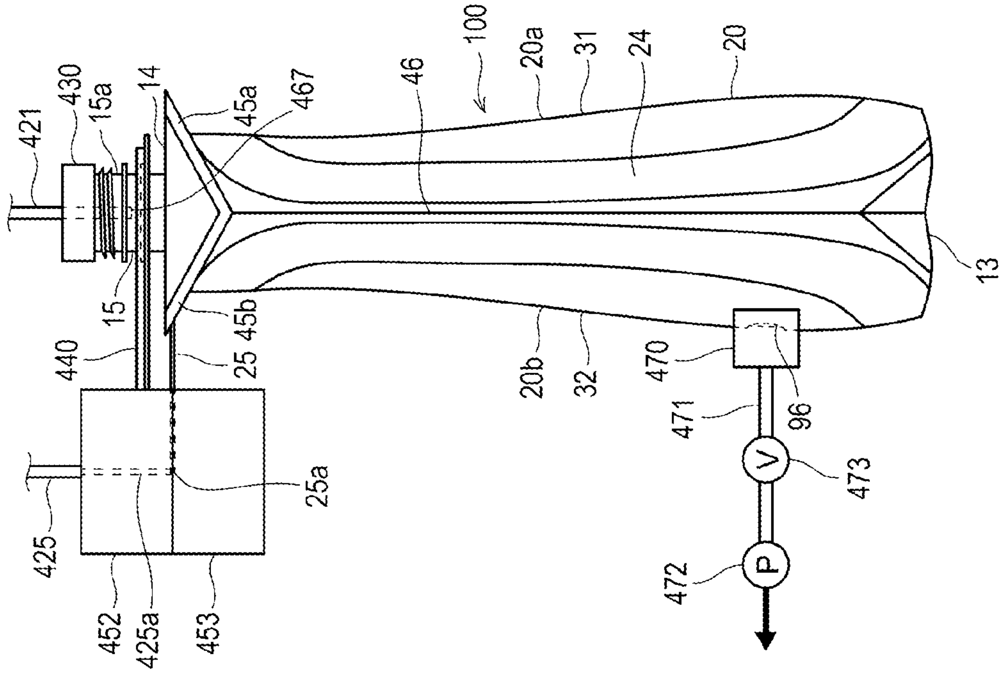

It is preferable to continue the vacuuming of the gap between the outer surface of the inner bag 40 and the inner surface of the container body 20 through the external air intake hole 96 even when performing the injecting of the filler (FIG. 15B).

For example, after the filler is injected into the filling portion 60 and the filling portion 60 is sealed, the suction pump 472 is stopped and the stopper member 470 is removed from the external air intake hole 96.

The present invention is not limited to or by the foregoing embodiments, rather, various modifications and improvements, and so forth, within the scope of achieving the object of the present invention are incorporated herein.

For example, although an example of manufacturing a sheet material container 100 that includes an inner bag 40 was described in each of the foregoing embodiments, the present invention is not limited to or by this example, rather, a sheet material container 100 which does not include the inner bag 40 may also be manufactured. When the sheet material container 100 does not include the inner bag 40, the containing region 17 is configured from the container body 20. In other words, the container body 20 is formed and the containing region 17 is configured by attaching portions of the inner film layer 23 of the main-body forming sheet member 21 at the periphery sealing portion 19, and the main-body forming sheet member 21 does not have the external air intake holes 96, 97.

Even in a sheet material container 100 that does not include the inner bag 40, the expanding of the container body 20 is provided as the foregoing embodiment, and the filler is injected in a state where the container body 20 is expanded, thereby enabling filler to be easily injected.

In addition, in each of the foregoing embodiments, an example was described in which the expanding of the container body 20 is performed by directly blowing gas into the containing region 17; however, the present invention is not limited to or by this example. The container body 20 may also be expanded by introducing gas into the containing region 17 by inserting a parison into the containing region 17 and expanding the parison, or the container body 20 may be expanded by introducing gas into the containing region 17 indirectly by deforming and enlarging the sheet material container 100 by using a machine or an expansion material, or the like.

The cap portion 70 may also, for example, not include the pump portion 72, support cylinder portion 74, head portion 73, and nozzle portion 75, and may be a screw cap with a lid that opens and closes.

Furthermore, the sheet material container 100 may stand on its own with the discharge port facing downward (inverted posture), or may be placed with the body portion 11 lying on a mounting surface.

Moreover, the various components of the sheet material container 100 do not have to be independent of each other, and a plurality of components may be formed as one component, one component may be formed by a plurality of components, a certain component may be part of another component, and part of a certain component may overlap with part of another component, and so forth.

REFERENCE SIGNS LIST

11 Body portion
13 Bottom gusset portion (planar portion)
14 Top gusset portion (planar portion)
15 Spout member
17 Containing region
18 Contents
19 Periphery sealing portion
20 Container body
20*a* First main surface portion (planar portion, first planar portion)
20*b* Second main surface portion (planar portion, second planar portion)
21 Main-body forming sheet member
22 Outer film layer
23 Inner film layer
24 Non-attached region
25 Extending portion
25*a* Injection port
26 Main-body sealing portion
40 Inner bag
41 Inner-bag forming sheet member
46 Lateral edge sealing strip
51 Container forming sheet member
60 Filling portion
65 Interfacial connecting portion
81, 82, 83, 84, 85, 86 Folding line
96 External air intake hole
100 Sheet material container
422 First regulator (regulator)
430 Stopper member
467 Gas supply port

The invention claimed is:

1. A method for manufacturing a sheet material container wherein the sheet material container comprises:

one or a plurality of sheet members including a main-body forming sheet member that has an outer film layer and an inner film layer which are mutually stacked, a containing region that accommodates contents, and a container body that is configured from the main-body forming sheet member and that surrounds the containing region, and the main-body forming sheet member having a main-body sealing portion, which is an attached region between the outer film layer and the inner film layer, and a non-attached region where the outer film layer and the inner film layer are partially not attached, and further having a filling portion where a filler is enclosed between the layers of the outer film layer and the inner film layer in the non-attached region, the method comprising:

introducing gas into the containing region so as to expand the container body;

injecting the filler between the layers of the outer film layer and the inner film layer in the non-attached region in a state where the container body has been expanded, wherein the sheet material container has an inner bag that defines the containing region, wherein the inner bag is configured from an inner-bag forming sheet member, which is an innermost-layer sheet member among the one or plurality of sheet members, wherein the main-body forming sheet member has an external air intake hole, through which external air is taken in, in a gap between an outer surface of the inner bag and an inner surface of the container body, wherein closing the external air intake hole is performed after the expanding of the container body, and wherein injecting the filler is performed in a state where the external air intake hole is closed.

2. The method for manufacturing a sheet material container according to claim 1, wherein expanding of the container body is performed by blowing gas into the containing region.

3. The method for manufacturing a sheet material container according to claim 2, wherein the injecting of the filler is performed while holding the inside of the containing region in a positive pressure state.

4. The method for manufacturing a sheet material container according to claim 3, wherein a sealing of the filling portion is performed after the positive pressure state inside the containing region is released.

5. The method for manufacturing a sheet material container according to claim 2, wherein the gas is blown into the containing region while gradually reducing the flow rate of the gas.

6. The method for manufacturing a sheet material container according to claim 2, wherein, in the expanding of the container body, a set gauge pressure of a regulator on a supply source side is set to equal to or more than 1 kPa and equal to or less than 1000 kPa when supplying the gas from the supply source to the containing region.

7. The method for manufacturing a sheet material container according to claim 2, wherein the sheet material container has a mouth portion with which the contents are poured out from the containing region, and wherein the expanding of the container body is performed by closing the mouth portion using a stopper member and blowing gas into the containing region from a gas supply port provided to the stopper member.

8. The method for manufacturing a sheet material container according to claim 1, wherein the injecting of the filler is performed while gradually reducing a flow rate of the filler.

9. The method for manufacturing a sheet material container according to claim 1, wherein the sheet material container has a periphery sealing portion in which the one or plurality of sheet members are bent along bending lines and in which portions of peripheral edge portions of at least an innermost-layer sheet member among the one or plurality of sheet members are mutually attached, and wherein the container body comprises a plurality of planar portions.

10. The method for manufacturing a sheet material container according to claim 9, wherein the expanding of the container body is performed in a state where the peripheral edge portions of the one or plurality of sheet members are not attached at a portion in the extending direction of the periphery sealing portion.

11. The method for manufacturing a sheet material container according to claim 10, further comprising:

sealing the filling portion after the injecting of the filler, wherein, in the sealing of the filling portion, points at which the peripheral edge portions of the one or plurality of sheet members are not attached are attached at the same time as the filling portion is sealed.

12. The method for manufacturing a sheet material container according to claim 11, wherein an extending portion that extends outwardly is formed on the main-body forming sheet member, and the extending portion has an injection port with which the filler is injected, and wherein, in a position of overlapping with the extending portion, the peripheral edge portions of the one or plurality of sheet members are not attached.

13. The method for manufacturing a sheet material container according to claim 9, wherein the plurality of planar portions include a first planar portion and a second planar portion that are adjacent to each other, and wherein the filling portion includes an interfacial connecting portion that is disposed so as to straddle the first planar portion and the second planar portion across a boundary between the first planar portion and the second planar portion.

14. The method for manufacturing a sheet material container according to claim 1, wherein vacuuming the gap through the external air intake hole after the expanding of the container body, and injecting the filler are performed.

15. The method for manufacturing a sheet material container according to claim 1, wherein the sheet material container does not comprise an inner bag, and the containing region is configured from the container body.

16. The method for manufacturing a sheet material container according to claim 1, comprising: filling the containing region with the contents in a state where the filler is enclosed in the filling portion by the injecting of the filler.

* * * * *